US009137977B2

(12) United States Patent
Davidson

(10) Patent No.: US 9,137,977 B2
(45) Date of Patent: Sep. 22, 2015

(54) FISHING LURE FOR IMPLEMENTING A FISHING CONTEST

(76) Inventor: Kent G. Davidson, Pleasanton, CA (US)

(*) Notice: Subject to any disclaimer, the term of this patent is extended or adjusted under 35 U.S.C. 154(b) by 15 days.

(21) Appl. No.: 13/366,172

(22) Filed: Feb. 3, 2012

(65) Prior Publication Data
US 2012/0144723 A1 Jun. 14, 2012

Related U.S. Application Data

(63) Continuation-in-part of application No. 12/475,537, filed on May 31, 2009, now Pat. No. 8,756,853, which is a continuation of application No. 11/386,914, filed on Mar. 21, 2006, now Pat. No. 7,669,360.

(51) Int. Cl.
A01K 85/00 (2006.01)
A01K 85/01 (2006.01)
A01K 85/16 (2006.01)
A01K 97/00 (2006.01)

(52) U.S. Cl.
CPC ............... A01K 85/01 (2013.01); A01K 85/16 (2013.01); A01K 97/00 (2013.01)

(58) Field of Classification Search
USPC ......... 43/4, 4.5, 17.1, 17.6, 42; 340/539, 573, 340/870.03, 870.19
See application file for complete search history.

(56) References Cited

U.S. PATENT DOCUMENTS

| | | | |
|---|---|---|---|
| 1,974,381 A | 9/1934 | Swanson et al. | |
| 2,768,468 A | 10/1956 | Kibler et al. | |
| 2,775,057 A | 12/1956 | Ludgate | |
| 2,986,838 A | 6/1961 | Smyser | |
| 3,087,338 A | 4/1963 | Horbinski et al. | |
| 3,091,885 A | 6/1963 | Ulsh | |
| 3,210,883 A | 10/1965 | Ulsh | |
| 3,217,443 A | 11/1965 | Goodman | |
| 3,382,598 A | 5/1968 | Wilson | |
| 3,488,877 A | 1/1970 | Carabasse | |
| 3,518,784 A | 7/1970 | Kling et al. | |
| 3,541,720 A | 11/1970 | Buffet | |
| 3,628,274 A | 12/1971 | Wojahn | |
| 3,631,625 A * | 1/1972 | Castner | 43/42.33 |
| 3,631,626 A * | 1/1972 | Keenan | 43/42.24 |
| 3,685,196 A | 8/1972 | Scott | |
| 3,721,124 A | 3/1973 | Franks | |
| 3,722,129 A | 3/1973 | Jensen | |
| 3,762,092 A * | 10/1973 | Bercz et al. | 43/17.6 |

(Continued)

OTHER PUBLICATIONS

Key West Fishing Tournament, Jul. 31, 2012, http://www.keywestfishingtournament.com/.

Primary Examiner — Sunit Pandya
(74) Attorney, Agent, or Firm — Bever, Hoffman & Harms, LLP

(57) ABSTRACT

A fishing lure includes a transparent lure body having one or more optical windows that operate as lenses for one or more digital cameras mounted within the transparent lure body. The transparent lure body is shaped like a fish, and the optical windows/digital cameras are located at positions that correspond with the eyes of the fish. Annular eye pieces can be mounted over the optical windows to enhance the appearance of the lure. A reflective shroud, patterned to imitate the body surface of a fish, is mounted within the transparent lure body. Light emitting devices within the transparent lure body can be controlled to emit different colored light through the transparent lure body. Detachable bills/fins can be coupled to the transparent lure body to control the movement of the fishing lure through the water.

12 Claims, 21 Drawing Sheets

(56) References Cited

U.S. PATENT DOCUMENTS

| | | |
|---|---|---|
| 3,785,079 A | 1/1974 | Rohn |
| 3,808,731 A | 5/1974 | Lowrance |
| 3,922,808 A | 12/1975 | Rieth et al. |
| 3,973,349 A | 8/1976 | England |
| 4,050,180 A | 9/1977 | King |
| 4,051,616 A | 10/1977 | Mathauser |
| D252,818 S * | 9/1979 | Cope .......................... D22/126 |
| 4,276,711 A | 7/1981 | Mathauser |
| 4,349,976 A | 9/1982 | Hill |
| 4,418,489 A | 12/1983 | Mathauser |
| 4,422,258 A | 12/1983 | Adams et al. |
| 4,437,255 A | 3/1984 | Reed |
| 4,445,178 A | 4/1984 | Scheer et al. |
| 4,445,786 A | 5/1984 | Jackson |
| 4,485,398 A * | 11/1984 | Chapin et al. .................... 348/81 |
| 4,516,348 A | 5/1985 | Hirose et al. |
| 4,569,146 A | 2/1986 | Lowrance et al. |
| 4,625,446 A | 12/1986 | Morimoto |
| 4,635,391 A | 1/1987 | Early |
| 4,642,932 A | 2/1987 | Austin |
| 4,658,531 A | 4/1987 | Morimoto |
| 4,693,125 A | 9/1987 | Krutz et al. |
| 4,696,121 A | 9/1987 | Hernden |
| 4,697,371 A | 10/1987 | Hill |
| 4,713,967 A | 12/1987 | Overs et al. |
| 4,752,141 A | 6/1988 | Sun et al. |
| 4,752,878 A | 6/1988 | Sigurdsson et al. |
| 4,757,633 A | 7/1988 | Van Cleve |
| 4,845,883 A | 7/1989 | Langer |
| 4,848,018 A | 7/1989 | Clarke |
| 4,883,365 A | 11/1989 | Monzyk et al. |
| 4,899,480 A | 2/1990 | Park |
| 4,928,419 A | 5/1990 | Forrestal |
| 4,996,788 A | 3/1991 | Wieting et al. |
| 5,088,223 A | 2/1992 | Chu |
| 5,115,593 A | 5/1992 | Keough |
| 5,131,165 A | 7/1992 | Benson |
| 5,170,581 A | 12/1992 | Lyons |
| 5,351,434 A | 10/1994 | Krenn |
| 5,351,538 A | 10/1994 | McGuire et al. |
| 5,414,951 A | 5/1995 | Martin |
| 5,469,739 A | 11/1995 | McGuire |
| 5,483,767 A * | 1/1996 | Langer ............... 43/4 |
| 5,511,335 A * | 4/1996 | Langer ............... 43/4 |
| 5,546,695 A | 8/1996 | Langer |
| 5,553,940 A | 9/1996 | Nishihara |
| 5,581,930 A | 12/1996 | Langer |
| 5,627,802 A | 5/1997 | Langer |
| D386,499 S | 11/1997 | Langer |
| 5,782,033 A * | 7/1998 | Park et al. ............ 43/4 |
| 5,828,761 A | 10/1998 | Langer |
| 6,189,256 B1 | 2/2001 | Boys |
| 6,305,120 B1 | 10/2001 | Boys |
| 6,487,812 B2 | 12/2002 | Johnson |
| 6,502,345 B1 | 1/2003 | Doyle |
| 6,589,117 B1 | 7/2003 | Moritome et al. |
| 6,671,994 B1 * | 1/2004 | Klein ............... 43/17 |
| 6,722,079 B2 | 4/2004 | Schumer |
| 6,748,694 B1 | 6/2004 | Darling |
| 6,760,995 B2 | 7/2004 | Mueller |
| 6,775,946 B2 | 8/2004 | Wright |
| 6,784,920 B2 * | 8/2004 | Weber ............... 348/81 |
| 6,836,993 B1 | 1/2005 | Austin |
| 7,131,231 B1 * | 11/2006 | Lee ................... 43/17 |
| 7,207,133 B2 | 4/2007 | Schiemann et al. |
| 7,343,261 B1 | 3/2008 | Kell |
| 8,120,650 B2 * | 2/2012 | Laser ............... 348/81 |
| 2006/0090390 A1 | 5/2006 | Barth |
| 2006/0196105 A1 | 9/2006 | Michlitsch |
| 2008/0134564 A1 | 6/2008 | Tseng |
| 2009/0235572 A1 | 9/2009 | Pekin |

* cited by examiner

FISHING LURE FOR IMPLEMENTING A FISHING CONTEST

RELATED APPLICATIONS

The present invention is a continuation-in-part of pending U.S. patent application Ser. No. 12/475,537, filed May 31, 2009, which is a continuation of U.S. patent application Ser. No. 11/386,914 filed Mar. 21, 2006, now U.S. Pat. No. 7,669,360.

FIELD OF THE INVENTION

The present invention relates to a fishing system. More specifically, the present invention relates to a fishing lure that gathers environmental data that is subsequently stored in a database.

RELATED ART

FIG. 1 is a side view of a generic fishing lure 100. Lure 100 includes a body 101, line attachment ring 110, hook attachment rings 111-112 and hooks 121-122. Body 101 is typically made of rubber or plastic. A material, such as balsa wood, may be located inside of body 101 to affect the buoyancy of lure 100. Body 101 can have many different shapes, colors, markings or textures. For example, body 101 may include markings 102A-102B, which make lure 100 look more like a little fish.

Hooks 121 and 122 are attached to hook attachment rings 111-112, respectively, such that these hooks 121-122 dangle from body 101. A fishing line 120 is attached to line attachment ring 110 (typically by a leader). The other end of fishing line 120 is connected to a fishing rod (not shown). The fishing rod is used to cast lure 100 into the water. Lure 100 is then pulled through the water (via a reel on the fishing rod). Live fish are attracted by the movement and physical characteristics of lure 100. A live fish attempting to eat lure 100 will likely be caught on one or more of hooks 121-122, thereby enabling the fisherman to reel in the fish.

There are many variables involved with catching fish. Such variables include the lure characteristics, time of day, location, water temperature, water depth, water clarity. Many different types of lures have been developed to catch fish. These lures have typically been designed through a trial-and-error process, taking into consideration the above-described variables. For example, it may be desirable to design a lure that is optimized for use on a warm overcast day in relatively deep water. However, it is difficult to collect the large amounts of data necessary for designing optimized lures for different fishing conditions. It would therefore be desirable to have a system for collecting data that quantifies the variables that exist when fish are caught. Such data could then be farmed to determine which types of lures work best in certain fishing conditions.

Fishing is a quiet activity that is typically engaged by individuals or small groups of people. It is therefore typical for a fisherman to feel some isolation from his fellow fishermen. It would therefore be desirable to provide a common bond between individual fishermen, such that fishermen can feel part of a larger community.

In the past, a common bond between fishermen has been provided by fishing contests. However, it is typically difficult to gather sufficient numbers of fishermen at a certain location at a certain time in order to establish a contest.

Professional fishing contests have become a popular pastime, wherein anglers compete to catch the largest and/or the most fish. However, these fishing contests are typically only open to select professional fishermen. It would further be desirable to be able to make fishing contests available to the public on a regional or nationwide basis. It would also be desirable to have an improved system for tracking the progress of professional fishing contests.

The fishing experience typically extends beyond the actual act of fishing. For example, fishermen often enjoy preparing the lures that they will use on a particular fishing excursion. It would therefore be desirable to be able to provide data that identifies what type of lure may be successful in certain fishing conditions.

Moreover, fishermen like to share information and/or their fishing experiences with others. It would therefore be desirable to have a system capable of establishing a forum or mentor network for fishermen from various regions (or the same region).

The present invention will be more fully understood in view of the drawings and the following description.

DETAILED DESCRIPTION

Figure 1:
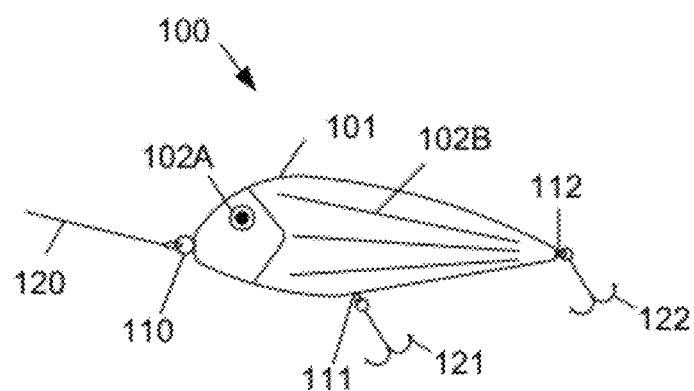
FIG. 1 is a side view of a conventional fishing lure.
Figure 2:
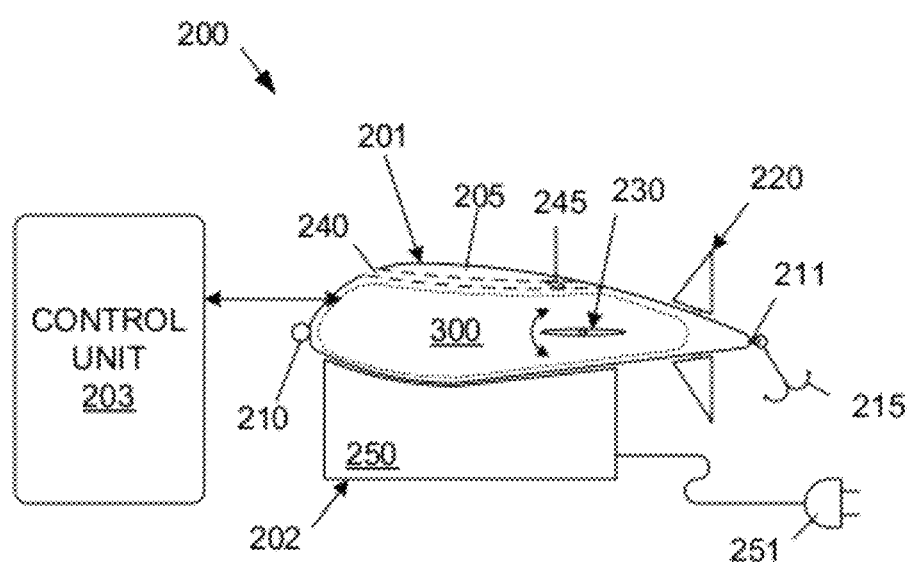
FIG. 2 is a schematic diagram of a fishing system, which includes a lure, a charging unit and a control unit.

FIG. 2 is diagram illustrating a fishing system 200 in accordance with one embodiment of the present invention. Fishing system 200 includes fishing lure 201, charging unit 202 and control unit 203. Lure 201 includes body 205, line attachment ring 210, hook attachment system 211, hook 215, rudder system 220, aileron system 230, water channel 240, valve system 245, and electronic/mechanical (E/M) control system 300. Lure 201 can also include markings, similar to markings 102A and 102B. However, such markings are not shown in FIG. 2 for reasons of clarity. In accordance with one embodiment, markings and colorings are provided on body 205 by placing a pre-marked/pre-colored plastic shrink wrap sleeve over body 205, and heating the sleeve, such that the plastic shrinks to conform with the surface of body 205. Such a sleeve can subsequently be removed and replaced with another sleeve, thereby changing the appearance of the lure any number of times. Although body 205 is shown as having a specific shape, it is understood that body 205 can have different shapes in different embodiments of the present invention. Moreover, although lure 201 is shown with one hook 215, it is understood that other numbers and types of hooks can be used in other embodiments. For example, lure 201 can utilize spinners, flies, a hook and sinker, trolling jigs or plugs.

Aileron system 230 includes ailerons located on the left and right sides of lure 201. In accordance with one embodiment of the present invention, these ailerons are capable of rotating along a horizontal axis, in the directions illustrated by the bi-directional arrow adjacent to aileron system 230. Similarly, rudder system 220 includes rudders located on the top and bottom sides of lure 201. In accordance with one embodiment, these rudders are capable of rotating about a vertical axis. As described in more detail below, E/M control system 300 is programmable to control the rotation of the ailerons and rudders, thereby controlling the path of lure 201 in the water. In general, aileron system 230 controls the vertical movement of lure 201, while rudder system 220 controls the horizontal movement of lure 201.

In another embodiment, the rudders on the top and bottom sides of lure 201 are fixed. In yet another embodiment, lure 201 does not include aileron system 230 or rudder system 220.

Water channel 240 extends through body 205 of lure 201. Valve system 245 is located near the rear end of water channel 240. As described in more detail below, water channel 240 is used to retrieve a water sample. In general, both ends of water channel 240 are initially open while lure 201 is moving through the water, thereby allowing water to flow through water channel 240. At some point before the lure 201 is removed from the water, valve system 245 closes, thereby trapping a water sample in water channel 240. The valve system 245 also allows the fisherman to subsequently release the water sample from water channel 240, such that test can be performed on the water sample. As described in more detail below, valve system 245 can be closed by E/M control system 300, or by strictly mechanical elements. In an alternate embodiment of the present invention, lure 201 does not include water channel 240. In this embodiment, the fisherman may manually take a water sample, or may not take a water sample at all.

Charging unit 202 is used to charge a rechargeable battery present in E/M control system 300. Charging unit 202 includes a charging base 250 and an electrical plug 251. Electrical plug 251 is plugged into a standard AC outlet, thereby energizing charging base 250. Lure 201 is designed to dock with charging base 250, thereby placing a charging element within charging base 250 in close proximity with a recharging circuit in E/M control system 300 (see, FIG. 3). In the described embodiment, a contact-less recharging mechanism is used, thereby allowing the recharging circuit and the battery in E/M control system 300 to be retained in a water-tight capsule within body 205. Contact-less charging is a well known process, which is typically performed by transferring energy via magnetically coupled transformer windings. In other embodiments, the rechargeable battery can be charged by other processes, including solar power, a 12 Volt DC source or 9 Volt batteries.

Figure 3:
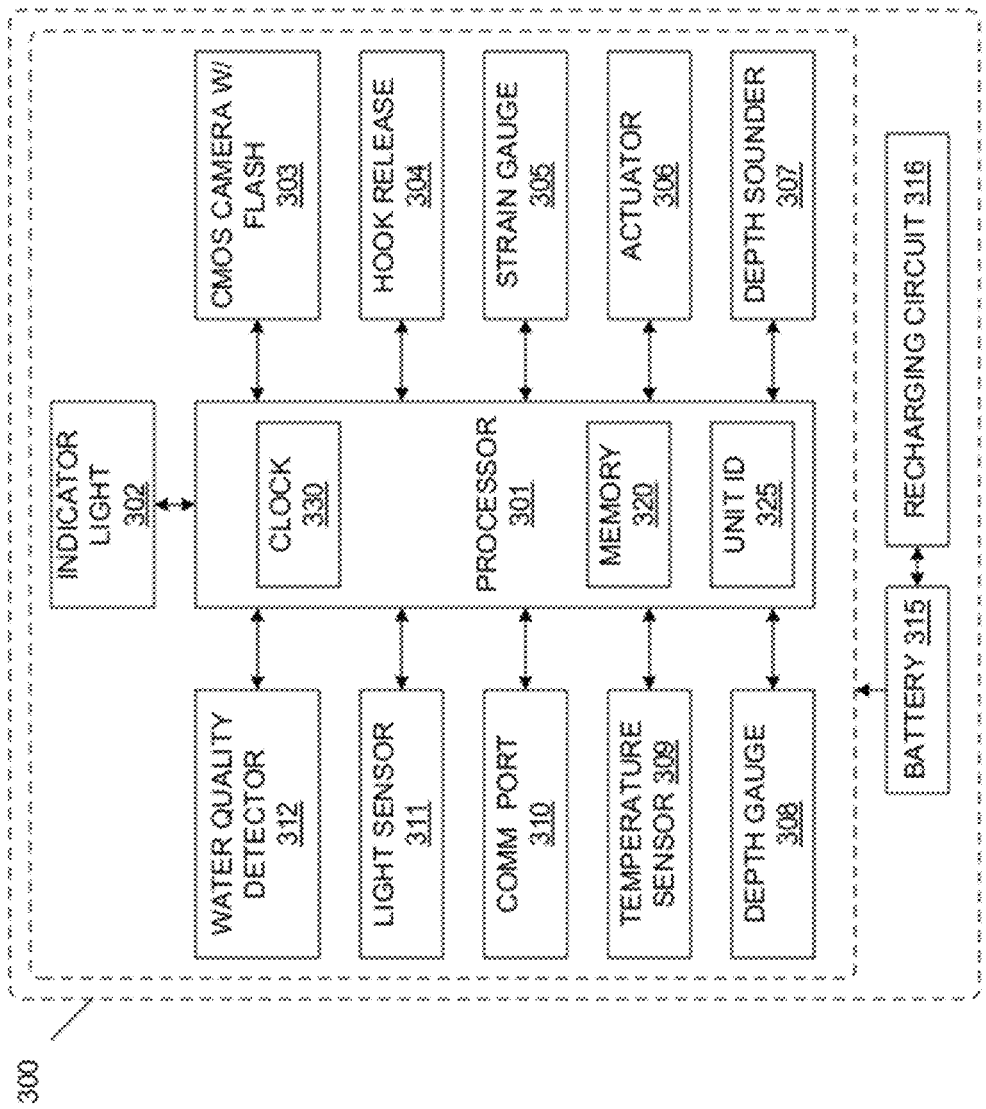
FIG. 3 is a block diagram of electrical/mechanical control elements located within the lure of FIG. 2 in accordance with one embodiment of the present invention.

FIG. 3 is a block diagram of E/M control system 300 in accordance with one embodiment of the present invention. E/M control circuit 300 includes microprocessor 301, indicator light 302, digital camera 303, hook release mechanism 304, strain gauge system 305, electrical/mechanical actuator 306, depth sounder 307, depth gauge 308, temperature sensor 309, communication port 310, light sensor 311, water quality detector 312, rechargeable battery 315 and recharging circuit 316. All of these elements are sealed to be waterproof within body 205. Rechargeable battery 315 supplies the required power to the other elements of E/M control system 300. Charging base 250 charges battery 315 through recharging circuit 316 in the manner described above. In the described embodiment, rechargeable battery 315 includes a plurality of lithiumion/manganese dioxide batteries. Such batteries are available from VARTA Geratebatterie GmbH, Daimlerstr. 1, D-73479 Ellwangen/Jagst, as part number MC621 or MC614, having a nominal voltage of 3 Volts and a capacity of about 1.1 to 1.5 mAh. Other batteries can be used in other embodiments.

Processor 301 includes memory 320, unit identification storage element 325 and clock 330. Although these elements are shown as being internal to processor 301, it is understood that in other embodiments, one or more of these elements may be implemented outside of processor 301. In general, memory 320 stores data provided by the other elements of E/M control system 300. Unit identification storage element 325 is a non-volatile memory configured to store a serial number, which uniquely identifies lure 201. This serial number is preferably encrypted to prevent a user from easily accessing this number. Prior to using the fishing system 200, the fisherman registers lure 201 by mail or by Internet, such that the serial number of lure 201 is associated with the fisherman. Clock 330 is a timekeeping reference, which keeps track of the present time and date. In accordance with one embodiment, clock 330 is automatically set via the U.S. atomic clock radio signal, such that accurate recordings are ensured. In accordance with another embodiment, clock 330 is externally programmed through communication port 310. More specifically, clock 330 may be programmed by control unit 203 (which automatically receives the correct time and date through a wireless network). In one embodiment, processor 301 is implemented using a BASIC Stamp 2 Module available from Parallax Inc. as part number BS2-IC. This microcontroller is a 24-pin DIP module having its own processor, memory, clock and interface via 16 I/O pins. Processor speed is about 20 MHz, program execution speed is about 4000 instructions per second, RAM size is 32 bytes, EEPROM program size is 2K Bytes (about 500 instructions), and the module size is about 1.2"×0.6"×0.4". It is important to note that other processors can be used in other embodiments.

Indicator light 302 is typically visible on an exterior surface of lure 201. Indicator light 302 is controlled by processor 301, and can be used to identify various information concerning the state of lure 201. For example, processor 301 may turn on indicator light 302 while battery 315 is charging. Similarly, processor 301 may cause indicator light 302 to flash in predetermined patterns to convey information related to the state of lure 201. For example, a first flashing pattern may indicate that battery 315 must be recharged, a second flashing pattern may indicate that microprocessor 301 has successfully captured data associated with catching a fish, a third flashing pattern may indicate that microprocessor 301 was successfully programmed, a fourth flashing pattern may indicate that microprocessor 301 was successfully reset, and a fifth flashing pattern may indicate a malfunction within E/M control system 300. Indicator light 302 may not be included in some embodiments of the present invention.

E/M control system 300 includes several sensors that collect information that identifies the ambient fishing conditions. These sensors include strain gauge 305, depth sounder 307, depth gauge 308, temperature sensor 309, light sensor 311, water quality detector 312 and digital camera 303.

Strain gauge system 305 provides a measurement of the tension applied to the fishing line. In accordance with one embodiment, strain gauge system 305 includes a strain gauge, which is formed by an elastomeric piezoelectric material (hereinafter 'piezo material'). The resistance of the piezo material varies in response to the applied strain. The piezo material is anchored within lure 201. As described in more detail below, hook release system 304 is connected to the piezo material in a manner which causes this material to be placed under increased strain when the strain on the hook 215 is increased. The piezo material is electrically connected to processor 301, which measures the resistance of the piezo material in order to identify the strain applied to hook 215. In accordance with one embodiment, the piezoelectric material is a pressure activated conductive rubber, such as ZOFLEX™ ZF40, which is available from Xilor Inc. Processor 301 monitors the strain(s) reported by strain gauge system 305. Processor 301 is programmed to perform certain operations when the detected strain exceeds a predetermined threshold strain. The predetermined threshold strain is selected to be less than the strain associated with hooking a fish on lure 201. The predetermined threshold strain is also selected to be less than the strain associated with a fisherman pulling on lure 201 while a hook is irretrievably embedded in an underwater obstruction. However, the predetermined threshold strain is selected to be greater than the strain associated with other normal fishing activities (e.g., casting lure 201, pulling lure 201 through water, or having a fish nibble on lure 201). By selecting the predetermined threshold strain in this manner, processor 301 can accurately detect when a fish has been hooked or when lure 201 is stuck.

Upon detecting that the measured strain exceeds the predetermined threshold strain (i.e., when a fish is hooked or lure 201 is stuck), processor 301 collects data from the various sensors present in E/M control system 300, and stores this data in memory 320. Note that this data can include the measured strain. The other sensors in E/M control system 300 are described in more detail below. If the measured strain exceeded the predetermined threshold strain because a fish was hooked on lure 201, then the data stored in memory 320 is subsequently downloaded to control unit 203, thereby recording details associated with the caught fish.

If the measured strain exceeded the predetermined threshold strain because the hooks of lure 201 became irretrievably stuck, then microprocessor 301 erases the data stored in memory 320, and instructs hook release system 304 to release hook 215, thereby allowing lure 201 to be retrieved. Hook release system 304 is described in more detail below.

Processor 301 differentiates between a hooked fish and a stuck lure by monitoring the time that the measured strain continuously exceeds the predetermined threshold strain. The fisherman is instructed to continuously pull on lure 201 for a relatively long predetermined time period (e.g., one minute) in the event that lure 201 becomes stuck. The predetermined time period is selected to be long enough that normal fishing activities (e.g., landing a fish) would never result in a measured strain that continuously exceeds the predetermined threshold strain for the predetermined time period. Upon detecting that the measured strain continuously exceeds the predetermined threshold strain for the predetermined time period, processor 301 identifies the event as a stuck lure. In this manner, processor 301 is reliably able to identify when lure 201 is irretrievably stuck. Conversely, microprocessor 301 never activates hook release system 304 during normal fishing activities.

In accordance with another embodiment, strain gauge system 305 is coupled between line attachment ring 210 and body 205. However, in this embodiment, processor 301 must be prevented from performing undesired operations during the casting process (when the detected strain may exceed the predetermined threshold strain).

Turning now to the other sensors in E/M control system 300, depth sounder 307 is an active device, which is controlled by processor 301 to transmit an acoustic signal while lure 205 is in the water. Processor 301 causes depth sounder 307 to periodically transmit the acoustic signal. The acoustic signal reflects off the bottom of the body of water (e.g., the lake bottom) and returns to depth sounder 307. Depth sounder 307 detects the reflected acoustic signal. In response, depth sounder 307 transmits signals to processor 301 which are representative of the distance from the lure 201 to the bottom of the body of water (i.e., the depth of the water). In general, processor 301 determines the time elapsed between the time that the acoustic signal was transmitted from depth sounder 307, and the time the reflected acoustic signal was received by depth sounder 307, and uses this information (along with the known signal propagation speed in water) to calculate the depth of the water. Each time that processor 301 calculates the water depth, the result is stored in memory 320. In one embodiment, processor 301 overwrites the same location in memory each time the water depth is calculated. In this embodiment, processor 301 may disable depth sounder 307 upon detecting that the measured strain exceeds the predetermined threshold strain. By disabling depth sounder 307 in this manner, memory 320 will effectively store a water depth calculation which is representative of the water depth where the fish strikes lure 201. In another embodiment, processor 301 stores each water depth calculation separately within memory 320. In accordance with one embodiment, depth sounder 307 is a piezoceramic transducer available from cryotech.com.tw as part number 25C-10 EAR. This device operates at 25 KHz, includes both a transmitter and receiver, has an outside diameter of 9.9 mm, and is enclosed and waterproof. Other depth sounders 307 can be used in other embodiments.

Turning now to the next sensor, depth gauge 308 is a passive device, which measures the external water pressure applied to lure 201. This pressure increases as the depth of lure 201 increases. Thus, depth gauge 308 provides a measurement of the depth of lure 205 under the water surface. Depth gauge 308 continuously provides a pressure measurement to processor 301. Processor 301 may periodically record this pressure (lure depth) measurement in memory 320. Alternately, processor 301 may record the pressure (lure depth) measurement in memory 320 only when the measured strain exceeds the predetermined threshold strain (i.e., when a fish is hooked on lure 201, or lure 201 becomes stuck). In accordance with one embodiment, depth gauge 308 is available from Intersema Sensoric SA, Ch. Chapons-des-Pres 11, CH-2022 BEVAIX, Switzerland, as part number MS54xx (RoHS). Other depth gauges can be used in other embodiments.

Temperature sensor 309 is a passive device, which measures the temperature of the water when lure 201 is submerged. Temperature sensor 309 should be locates as close to the outer surface of body 205 as possible to obtain an accurate temperature measurement. Temperature sensor 309 continuously provides a temperature measurement to processor 301. Processor 301 may periodically record the water temperature measurement in memory 320. Alternately, processor 301 may record the water temperature measurement in memory 320 only when the measured strain exceeds the predetermined threshold strain (i.e., when a fish is hooked on lure 201, or lure 201 becomes stuck). In accordance with one embodiment, the functionality of temperature sensor 309 is provided by the above-described depth gauge available from Intersema Sensoric SA.

Light sensor 311 is also a passive device, which measures the amount of ambient light that reaches lure 201 while under water. In one embodiment, light sensor 311 is exposed at the top (dorsal) surface of lure 205. Light sensor 311 continuously provides light exposure information to processor 301. In accordance with one embodiment, processor 301 periodically records the light exposure measurement in memory 320, keeping only the most recent measurement. Processor 301 stops updating the light exposure measurement in memory 320 when the measured strain exceeds the predetermined threshold strain (i.e., when a fish is hooked on lure 201, or lure 201 becomes stuck). The light exposure measurement stored in memory 320 will therefore be representative of the amount of ambient light present when the fish is hooked. This light exposure measurement may be used to determine the existing weather conditions (e.g., sunny or cloudy) or the existing water conditions (e.g., clear or murky). This light exposure measurement may also be used to determine whether to activate a flash when using digital camera 303.

In another embodiment, processor 301 saves all of the periodic recorded light exposure measurements. In yet another embodiment, processor 301 only records a light exposure measurement when the measured threshold exceeds the predetermined threshold strain. Light sensor 311 can be implemented, for example, by a sensor commonly available from Photonic Detectors, Inc. as part number PDB-C113.

Water quality detector 312 is a sensor that is used to detect the quality of water present in water channel 240. For example, water quality detector 312 may determine whether the water present in water channel 240 contains an excessive amount of metals, toxicity, fertilizer, or other undesirable materials by exposing a test strip to the water in channel 240. The test strip changes physical or electrical properties in response to water having an excessive amount of the undesirable material. Upon detecting a change in the physical or electrical properties of the test strip, water quality detector 312 provides a signal to processor 301, which records this result in memory 320.

In the described embodiments, digital camera 303 includes a lens and an LED flash, which are exposed at the outer surface of body 205, and face to the rear (aft) of lure 201. Processor 301 activates digital camera 303, thereby causing camera 303 to take a picture, when the measured strain exceeds the predetermined threshold strain. Processor 301 may activate the flash every time the camera takes a picture. Alternatively, processor 301 may activate the flash only when the light sensor 311 indicates that the flash is necessary. Alternatively, digital camera 303 may have a sensitivity that eliminates the need for a flash. Processor 301 stores the image taken by digital camera 303 in memory 320. In this manner, digital camera 303 takes a picture of a fish, immediately after the fish has struck lure 201. In an alternate embodiment, processor 301 may introduce a short delay between the time that the measured strain exceeds the predetermined threshold strain and the time the picture is taken. Introducing this delay may result in a better picture of the fish. In another embodiment, processor 301 may cause digital camera 303 to take a series of pictures upon detecting that the measured strain exceeds the predetermined threshold strain.

In one embodiment, digital camera 303 may be an extremely sensitive CMOS camera. Alternately, digital cameral 303 may be an infra-red (IR) camera. For example, digital camera 303 may be a capsule camera that includes a CMOS image sensor, such as those available from MagnaChip Semiconductor as part numbers HV7151SPA, HV7161SPA2 or HF7171SPA3.

In accordance with one embodiment of the present invention, data from digital camera 303, strain gauge 305, depth sounder 307, depth gauge 308, temperature sensor 309 and light sensor 311 is stored at or about the time that the measured strain exceeds the predetermined threshold strain, thereby providing a snapshot of the ambient environmental conditions when a fish is caught.

In addition to the above-described measurement/sensor devices, E/M control system 300 includes other elements for controlling the movement and/or physical operation of lure 201. These elements include hook release system 304 and actuator system 306.

Figure 4A:
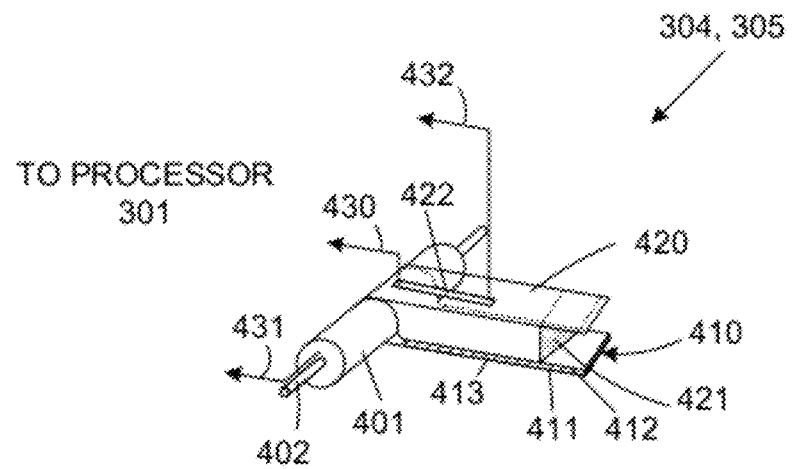
FIG. 4A is a schematic diagram illustrating a hook release system and a strain gauge system, in accordance with one embodiment of the present invention.

FIG. 4A is a schematic diagram illustrating hook release system 304 and strain gauge system 305, in accordance with one embodiment of the present invention. Strain gauge system 305 and hook release system 304 collectively include piezo material 401, anchor bar 402, base structure 410, bi-metal strip 420, hook keeper 421, heating element 422, and electrical leads 430-432. Anchor bar 402 extends through piezo material 401. The ends of anchor bar 402 are fixedly connected to lure 201 (e.g., to body 205 or to a printed circuit board attached to processor 301). Base structure 410 includes a metal strip, which is wrapped around piezo material 401. The top portion of this metal strip is labeled as top metal portion 411, while the bottom portion of the metal strip is labeled as bottom metal portion 412. Top and bottom metal portions 411 and 412 are connected by a waterproof adhesive 413 or solder. Base structure 410 is capable of rotating about piezo material 401.

Bi-metal strip 420 is fixedly attached to base structure 410 near piezo material 401. Bi-metal strip 420 extends in parallel with top and bottom metal portions 411 and 412. Hook keeper 421 can be, for example, a triangular prism attached to the underside of bi-metal strip 420. In one embodiment, hook keeper 421 is made of steel. During normal conditions, hook keeper 421 is firmly in contact with top metal portion 411. The rigidity of hook keeper 421 may be enhanced by indenting a portion of the bi-metal strip 420.

Electrical lead 430 is electrically connected to one end of heating element 422, bi-metal strip 420 and the metal strip of base structure 410. Electrical lead 431 is electrically connected to an end of piezo material 401, as illustrated. Electrical lead 432 is coupled to the second end of heating element 422.

Heating element 422 is formed on the upper surface of bi-metal strip 420. In one embodiment, heating element 422 is an electric match, which is ignited (and generates heat) in response to a current applied across electrical leads 430 and 432. In another embodiment, heating element 422 can be a resistor having a high temperature coefficient, thereby allowing the resistor to heat up quickly in response to a current applied across electrical leads 430 and 432.

Figure 4B:
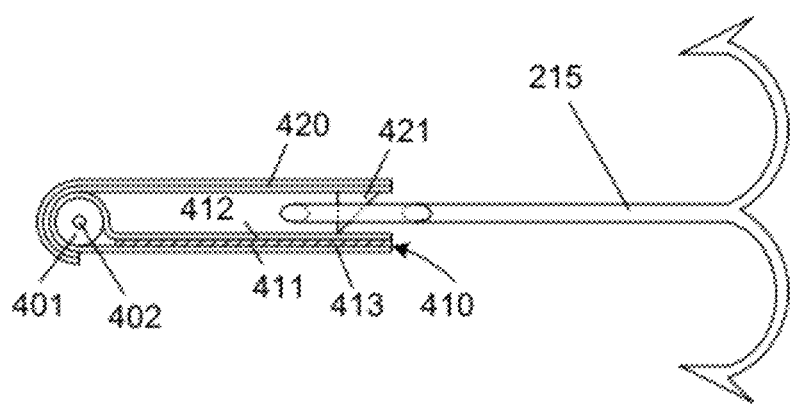
FIGS. 4B and 4C are side views of the hook release system and the strain gauge system of FIG. 4A in closed and opened states, respectively.

Hook release system 304 and strain gauge system 305 operates as follows. The end of hook 215 that includes the ring is inserted into the space between bi-metal strip 420 and the top metal portion 411 of base structure 410, until the outer edge of the ring is pushing against the ramped surface of hook keeper 421. Hook 215 is pushed until bi-metal strip 420 is forced upward, and the ring of hook slides past hook keeper 421. At this time, bi-metal strip 420 snaps downward, placing hook keeper 421 back in contact with base structure 410, effectively trapping hook 215 (with the ring of hook 215 encircling hook keeper 421). FIG. 4B is a side view illustrating hook 215 engaged with the hook release system 304/ strain gauge system 305 of FIG. 4A.

When hook 215 is pulled (e.g., by a fish), forces are exerted on piezo material 401, thereby changing the resistance of piezo material 401. Processor 301 monitors the resistance of piezo material 401 between electrical leads 430 and 431, and converts this resistance to a strain measurement. Processor 301 maintains electrical lead 432 in a floating (isolated) state at this time.

Figure 4C:
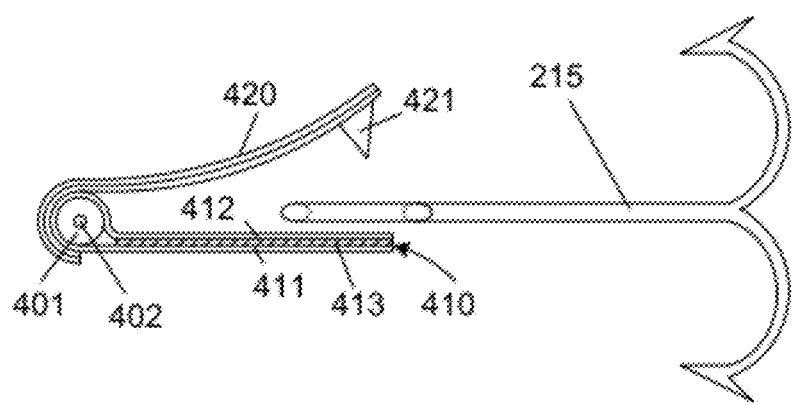

When processor 301 detects that hook 215 is irretrievably stuck, processor 301 causes an electrical current to flow through heating element 422 by applying an appropriate voltage across electrical leads 430 and 432. Processor 301 maintains electrical lead 431 in a floating state at this time. The current flowing through heating element 422 generates heat, which is transferred to bi-metal strip 420. When sufficiently heated, bi-metal strip 420 bends upward, thereby moving hook keeper 421 out of the path of the ring end of hook 215. At this time, hook 215 is effectively released from lure 201. This release condition is illustrated in FIG. 4C. A new hook may be attached to lure 201 in the manner described above, thereby allowing this lure to be used again. If heating element 422 is implemented by an electric match, then a new electric match is attached between the ends of electrical leads 430 and 432. In one embodiment, the electric match may be housed in a replaceable ceramic tube. This ceramic tube may also be used to house other elements, such as a scent ball.

Actuator system 306 can be used to mechanically control various elements on lure 201 in response to electrical signals provided by processor 301. For example, actuator system 306 can be used to control valve 245.

Figure 5A:
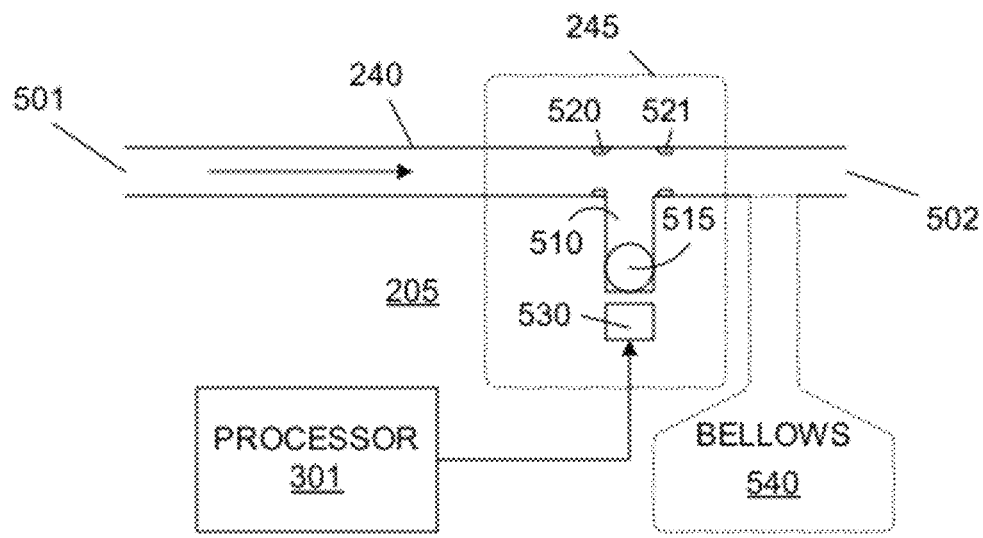
FIGS. 5A and 5B are cross sectional side views of a valve used to trap a water sample in accordance with one embodiment of the present invention.
Figure 5B:
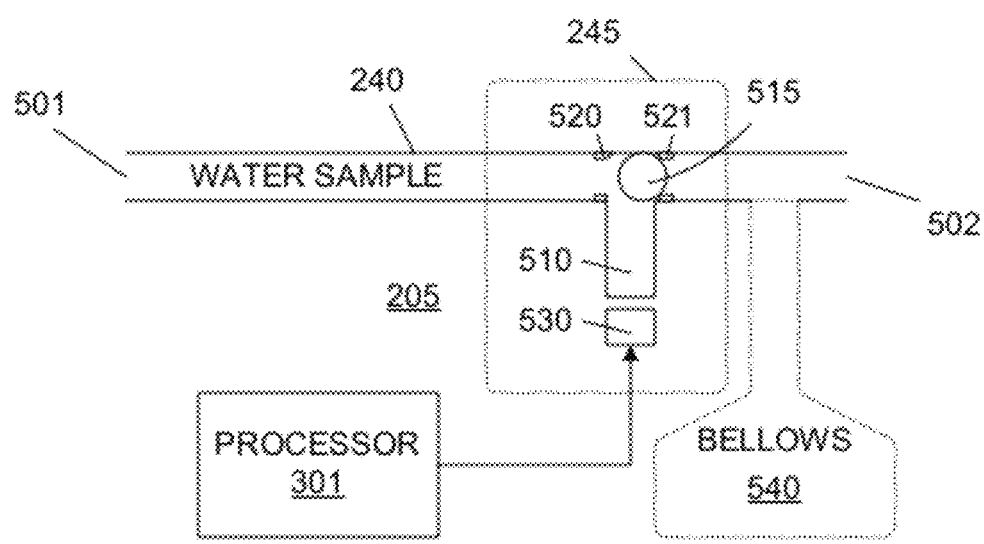

FIGS. 5A and 5B are cross sectional views of valve 245 during open and closed states in accordance with one embodiment of the present invention. Valve 245 includes recessed chamber 510, buoyant magnetic ball 515, retainers 520-521 and magnetic element 530. Recessed chamber 510 extends off of water channel 240. Buoyant magnetic ball 515 can be, for example, a hollow carbon fiber ball impregnated with a magnetic metal. Retainers 520-521 restrict the lateral movement of ball 515 within water channel 240. Magnetic element 530 is located at the bottom of recessed chamber 510. In the described embodiment, magnetic element 530 is an electromagnet, which is energized and de-energized in response to signals provided by processor 301.

When lure 201 is initially cast into the water, processor 301 energizes magnetic element 530, thereby pulling ball 515 to the bottom of recessed chamber 310 as illustrated in FIG. 5A. At this time, water flows freely from the front opening 501 of water channel 240 to the rear opening 502 of water channel 240.

After water flow has been established in water channel 240, processor 301 de-energizes magnetic element 530, thereby releasing ball 515. Upon being released, ball 515 floats up into water channel 240, and becomes lodged in retaining element 521, thereby creating a seal, as illustrated in FIG. 5B. A water sample is stored in front of ball 515 within water channel 240. In accordance with one embodiment, processor 301 de-energizes magnetic element 530 upon detecting that the measured strain exceeds the predetermined threshold strain (i.e., when a fish is hooked).

In an alternate embodiment, magnetic element 530 is implemented with a weak natural magnet, which is not coupled to processor 301. In this embodiment, magnetic element 530 holds ball 515 down until the buoyant force of the ball 515 overcomes the magnetic force of the natural magnet. At this time, ball 515 automatically releases to the position illustrated in FIG. 5B.

When lure 201 is removed from the water, the fisherman removes the water sample trapped in water channel 240. In accordance with one embodiment, the fisherman removes the water sample from the front opening 501 by blowing into the rear opening 502. Blowing into the rear opening 502 causes ball 515 to return to the bottom of recessed chamber 510, and forces the water sample out of the front opening 501 of water chamber 240. The fisherman holds a container over the front opening 501 to collect the water sample. In one variation, the fisherman may insert a small bellows into the rear opening 202 in order to force the air required to remove the water sample and reseat ball 515. In another embodiment, the fisherman seals the rear opening 502 of water channel 240 (e.g., by placing a finger over the rear opening 502), and squeezes a bellows 540 located within lure 201, achieving the same result. The use of bellows minimizes the possibility of contaminating the water sample.

The retrieved water sample can then be sent to a central testing facility, which performs an analysis of the water sample, and then stores the water analysis on a website database. In an alternate embodiment, the quality of the water released from water channel 240 is analyzed in the field using control unit 203. In yet another embodiment, the water quality is analyzed using a field test separate from control unit 203, and the results are downloaded to control unit 203.

Actuator system 306 can also be used to control the movement of lure 201 in the water. For example, actuator system 306 can be used to independently control aileron system 230 and rudder system 220.

Figure 6A:
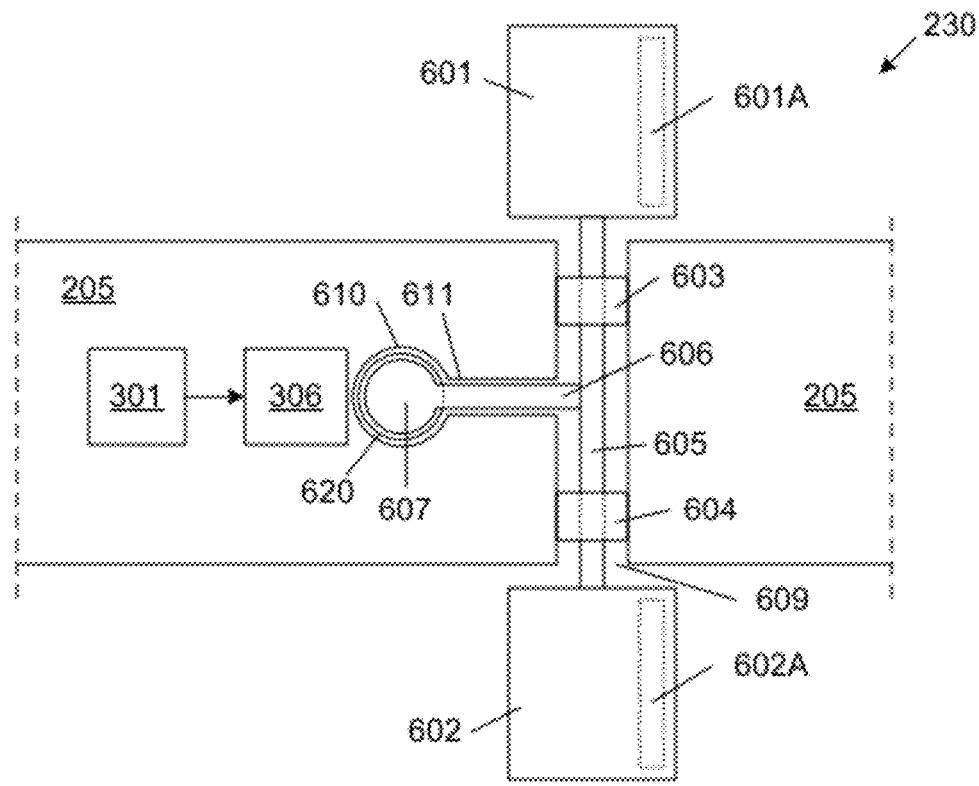
FIG. 6A is an exposed top view of an aileron system in accordance with one embodiment of the present invention.
Figure 6B:
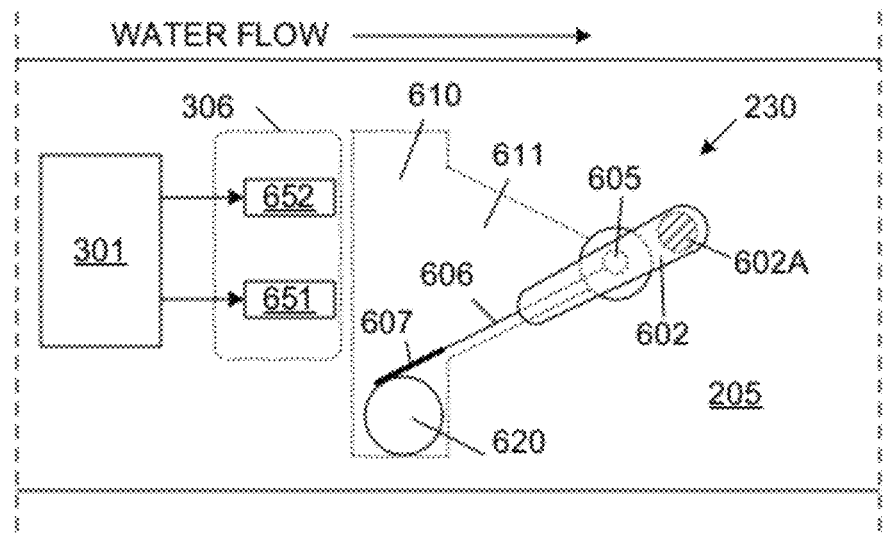
FIGS. 6B, 6C and 6D are exposed side views of the aileron system of FIG. 6A in three various positions.
Figure 6C:
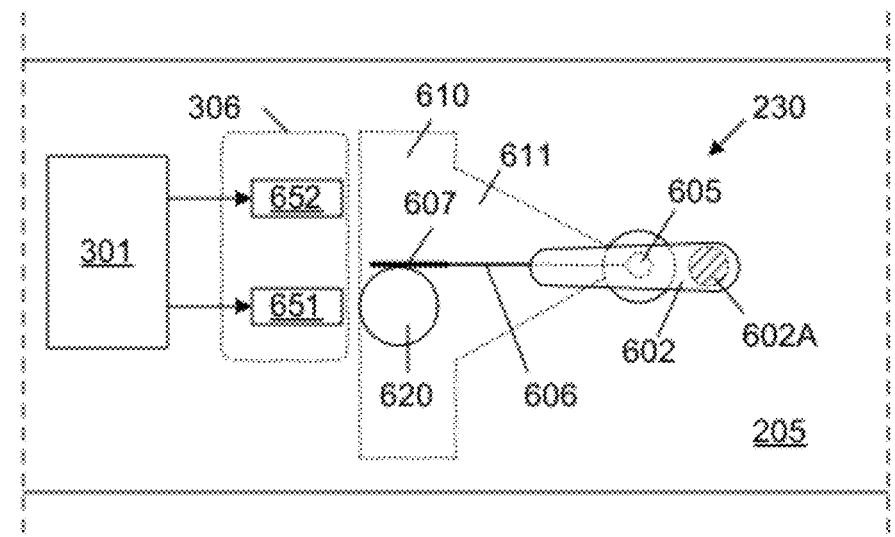
Figure 6D:
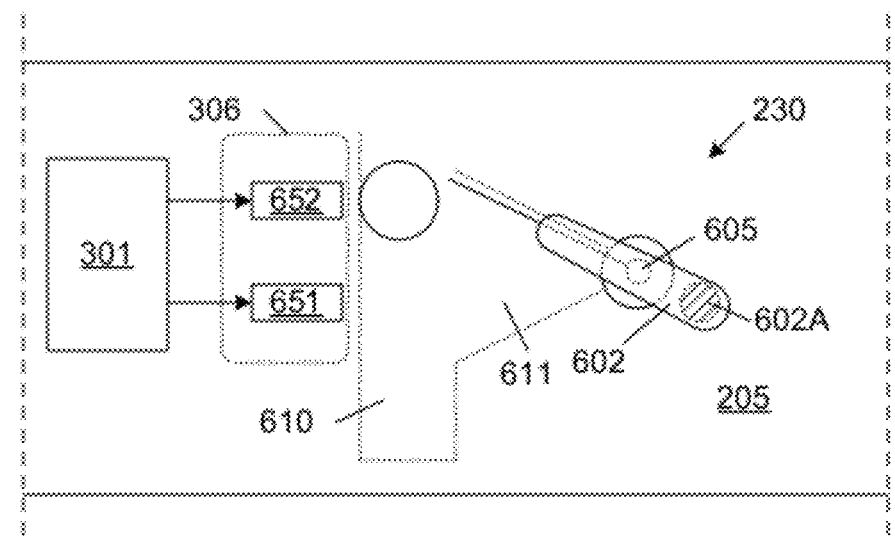

FIG. 6A is partially exposed top view of actuator system 306 and aileron system 230 in accordance with one embodiment of the present invention. FIGS. 6B, 6C and 6D are partially exposed side views of actuator system 306 and aileron system 230 in various positions. Aileron system 230 includes fins 601-602, bearing elements 603-604, axle 605, lever arm 606, lever end 607, and ball 620. Buoyant inserts 601A and 602A are located in the rear portions of fins 601 and 602, respectively. As described in more detail below, buoyant inserts 601A-602A ensure that the rear ends of fins 601 and 602 are raised higher than the front ends of fins 601 and 602 when actuator system 306 is disabled.

Fins 601-602 are fixedly attached to axle 605. Axle 605 extends through opening 609 in body 205. Axle 605 also extends through bearing elements 603-604, which are connected to body 205 within opening 609. In an alternate embodiment, bearing elements 603-604 are not included. Axle 605 is capable of rotating freely within a specified range, as described in more detail below.

Lever arm 606 is a rigid element, which is fixedly attached to axle 605. Lever end 607 is also a rigid element, which is connected to lever arm 606. Lure body 205 includes a hollow slot 611, which surrounds lever arm 607, and a hollow cylindrical shaft, which surrounds lever end 607. Ball 620, which is made of a magnetic metal, is located within hollow slot 611, under lever end 607. In accordance with an alternate embodiment, ball 620 is fixedly attached to lever end 607. In accordance with various embodiments, water may or may not enter hollow slot 611 and hollow shaft 610 during normal operation of lure 201.

Actuator system 306 includes electromagnetic elements 651 and 652, which are located at predetermined heights along the vertical hollow shaft 610. These electromagnetic elements 651-652 are controlled by processor 301 in the manner described below.

When lure 201 is initially cast into water, electromagnetic elements 651 and 652 are de-activated. As a result, the buoyant inserts 601A and 602A rise and ball 620 (which does not float in water) falls to the bottom of hollow shaft 610, such that fins 601 and 602 are pitched downward as illustrated in FIG. 6B. As water flows over the pitched down fins 601-602, the lure is forced downward within the water.

After lure 201 has reached a pre-programmed depth (as determined by depth sounder 307 and/or depth gauge 308), processor 301 activates electromagnetic element 651. As a result, metal ball 620 is attracted to electromagnetic element 651. The magnetic force applied to metal ball 620 is sufficient to overcome the buoyant forces of buoyant elements 601A-602A, thereby causing metal ball 620 to rise within hollow shaft 610. The final position of metal ball 620 is illustrated in FIG. 6C. While in this position, fins 601-602 are level, thereby causing lure to move horizontally within the water. Note that if the water flow is fast enough, the force introduced by the water flow alone may be sufficient to move fins 601-602 to a horizontal position.

Lure 201 can be controlled to move back up toward the water surface under predetermined conditions. To accomplish this, processor activates electromagnetic element 652 and de-activates electromagnetic element 651. Again, the magnetic force applied to metal ball 620 is sufficient to overcome the buoyant forces of buoyant elements 601A-602A, thereby causing metal ball 620 to rise toward the top of hollow shaft 610. The final position of metal ball 620 is illustrated in FIG. 6D. While in this position, fins 601-602 are pitched upward, thereby causing lure to move up toward the water surface.

In the foregoing manner, aileron system 230, actuator system 306 and processor 301 can control the up/down motion of lure 201 in water. Processor 301 can be programmed via control unit 203 to control actuator system 306. As described above, processor 301 can control aileron system 230 in response to the sensed depth of lure 201. Alternately, processor 301 can control aileron system 230 in a timed manner (e.g., dive for 5 seconds, level for 5 seconds, rise for 5 seconds, then repeat pattern). Processor 301 can also control aileron system 230 in response to other sensors on lure 201.

In an alternate embodiment, the actuator system 306 of FIGS. 6A-6D can be replaced with a small screw-drive motor, which moves a permanent magnet in response to signals provided by processor 301. The metal ball 620 follows the movement of the permanent magnet, thereby creating the desired movement of the aileron system 230. In one embodiment, the screw-drive motor is a squiggle SQL series linear motor available from New Scale Technologies, Inc., (www.NewScaleTech.com).

Figure 7:
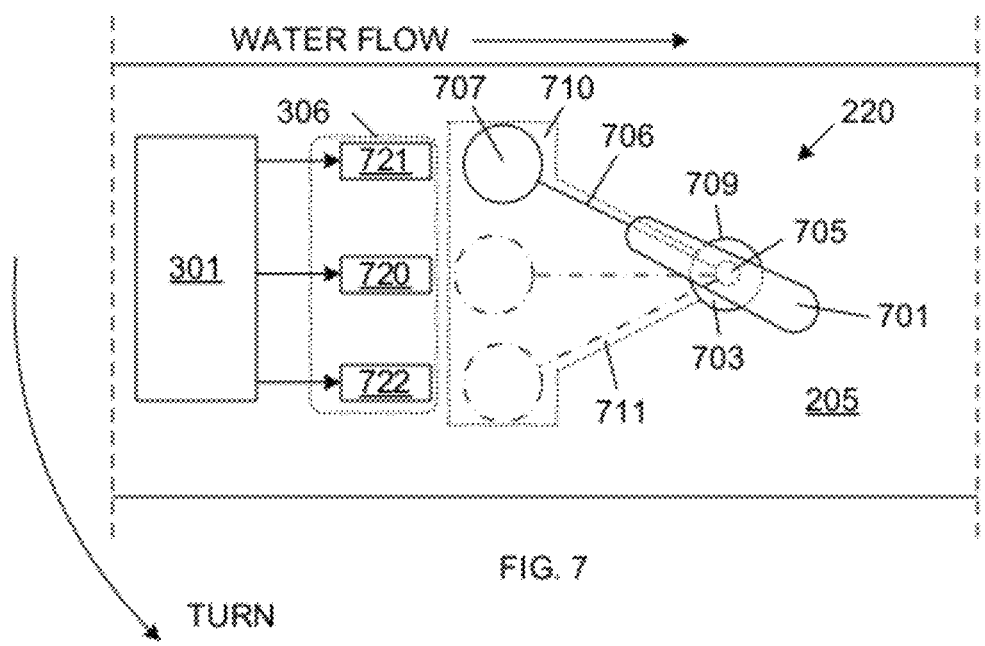
FIG. 7 is an exposed top view of a rudder system in accordance with one embodiment of the present invention.

FIG. 7 is a partially exposed top view of rudder system 220 and actuator system 306 in accordance with one embodiment of the present invention. Rudder system 220 is similar to aileron system 230. The illustrated portion of rudder system 220 includes fin 701, bearing 703, axle 705, lever arm 706, lever end 707, vertical opening 709, horizontal channel 710, and slot 711. In the described embodiment, a second fin (not shown) is connected to axle 705 at the bottom side of lure 201. FIG. 7 illustrates an embodiment wherein a rigid lever arm 706 is directly connected to magnetic metal ball 707. (This configuration can be applied to aileron system 230 in an alternate embodiment.)

Actuator system 306 includes three electromagnetic elements 720-722, which are controlled by processor 301. The manner of activating/de-activating electromagnetic elements 720-722 can be programmed via control unit 203, in the same manner described above for aileron system 230. Rudder system 230 is illustrated with electromagnetic element 721 activated, and electromagnetic elements 720 and 722 de-activated. Under these conditions, ball 707 is attracted to electromagnetic element 721. The alignment of fin 701 causes lure 201 to turn towards the left, as indicated by the large arrow. When electromagnetic element 720 is activated and electromagnetic elements 721-722 are deactivated, ball 707 is attracted to electromagnetic element 720, and lure 201 tends to travel straight. When electromagnetic element 722 is activated and electromagnetic elements 720-721 are deactivated, ball 707 is attracted to electromagnetic element 722, and lure 201 tends to travel to the right.

If the swing between electromagnetic elements 720-722 is relatively large, intermediate electromagnetic elements may be included between electromagnetic elements 720-722, thereby ensuring reliable transitions between fin positions (and providing more possible fin orientations).

By programming processor 301 in the appropriate manner, the fisherman can control the path of the lure in the water via aileron system 230 and rudder system 220, thereby providing the fisherman with more options while fishing. This feature will also allow the fisherman to avoid known obstacles in the water by programming the lure path appropriately.

In an alternate embodiment, the actuator system 306 of FIG. 7 can be replaced with a small screw-drive motor, which moves a permanent magnet in response to signals provided by processor 301, thereby positioning ball 707 in the manner described above.

In addition, to the above-described devices, E/M control circuit 300 includes a communication port 310, which enables processor 301 to communicate with external devices. In one embodiment, communication port 310 is an infra-red (IR) communication port. Communication port can form one (or both) eye markings on lure 201.

Communication port 310 allows the fisherman to program processor 301 to implement the various features described above. This programming will typically be implemented via control unit 203, which has a corresponding communication port.

Communication port 310 can also include a remote control receiver/transmitter, which allows the fisherman to remotely communicate with lure 201 while the lure is in the water. Such a remote control receiver/transmitter may be used, for example, to control the rudder system 220 while the lure 201 is in the water. That is, the rudder system 220 can be controlled to move the lure back and forth (i.e., from bank to bank) within a stream or river. If the water flow is fast enough, the fisherman would not even need to reel in the lure 201 in order to achieve this back and forth lure motion. That is, the lure 201 could move back and forth on a line having a fixed length. This would enable the fisherman to keep the lure in a desired area for an extended period of time.

Communication port 310 can also include a device that enables two-way tethered (wired) communication between the fisherman and lure 201. In this embodiment, the wired communication is enabled by a fiber-optic fishing line or a communication link (i.e., wire or fiber-optic cable) attached to the fishing line. Communication over a wire can be performed, for example, using Morse code. Much more information can be provided over a fiber-optic cable. For example, a live video feed can be provided from the camera 303 on lure 201. This live video feed could be broadcast on television during a professional fishing contest.

Figure 8:
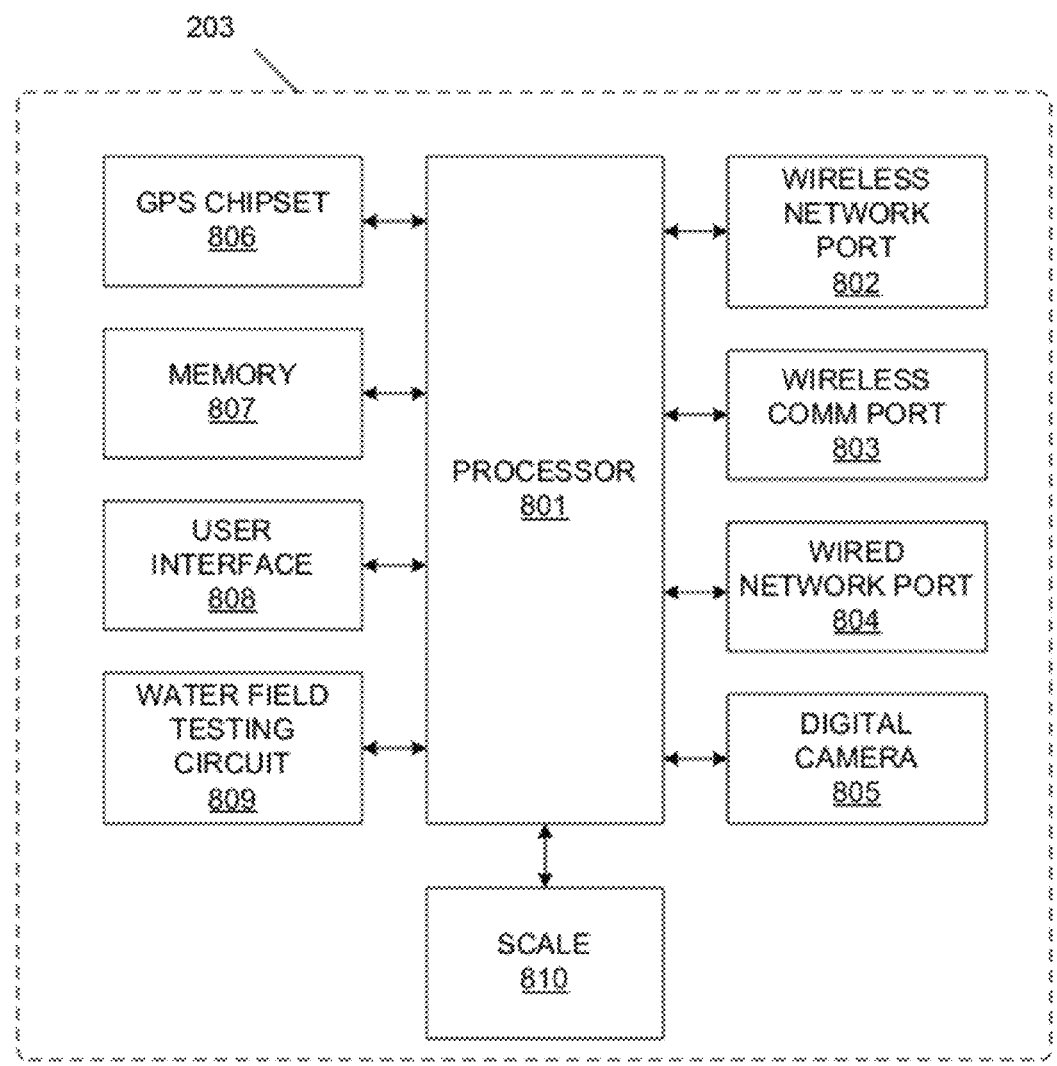
FIG. 8 is a block diagram of control elements located within the control unit of FIG. 2 in accordance with one embodiment of the present invention.

FIG. 8 is a block diagram of control unit 203 in accordance with one embodiment of the present invention. It is understood that in alternate embodiment, not all of the elements of control unit 203 will be required. Control unit 203 includes processor 801, wireless network port 802, wireless communication port 803, wired communication port 804, digital camera 805, GPS chipset 806, memory 807, user interface 808, water field testing device 809 and scale 810.

Control unit 203 communicates with lure 201 via wireless communication port 803. In the described embodiment, wireless communication port 803 is an infra-red (IR), Bluetooth or radio frequency (RF) port, which enables communication with lure 201 via communication port 310 of lure 201. The fisherman may place communication ports 310 and 803 in close proximity, thereby enabling control unit 203 to communicate with lure 201. User interface 808 enables the fisherman to initiate a transfer (download) of data from lure 201. Upon receiving the download request from user interface 808, processor 801 transmits a read request to lure 201 via communication ports 803 and 310. Upon receiving the request, processor 301 within lure 201 retrieves the contents of memory 320 (e.g., the information collected while catching a fish) and the contents of unit identification storage circuit 325 (e.g., the serial number of lure 201). Processor 301 causes this retrieved information to be transmitted to processor 801 (via communication ports 310 and 803). Processor 801 stores the retrieved information in memory 807.

After storing the retrieved information in memory 807, processor 801 automatically queries GPS chipset 806, thereby obtaining the current GPS coordinates (i.e., location) of the fisherman. Processor 801 stores these GPS coordinates in memory 807. In one embodiment, GPS chipset 806 is a Lassen SQ BPS module available from Trimble Navigation Ltd., 645 North Mary Avenue, Sunnyvale, Calif. 94086.

At this time, the fisherman can enable the digital camera 805 via the user interface 808. Once enabled, the digital camera 805 can be used to take a clear picture of a fish that was caught, along with the markings/colorings on the lure 201 used to catch the fish. Processor 801 stores this fish picture in memory 807 and/or transmits this fish picture to a network for display or verification.

The fisherman can also enable water field testing device 809 via the user interface 808. Once enabled, the fisherman places a water sample (typically retrieved from water channel 240) into the water field testing device 809 (through an opening in control unit 203). Water field testing device 809 may then perform water testing in the following manner.

Figure 9:
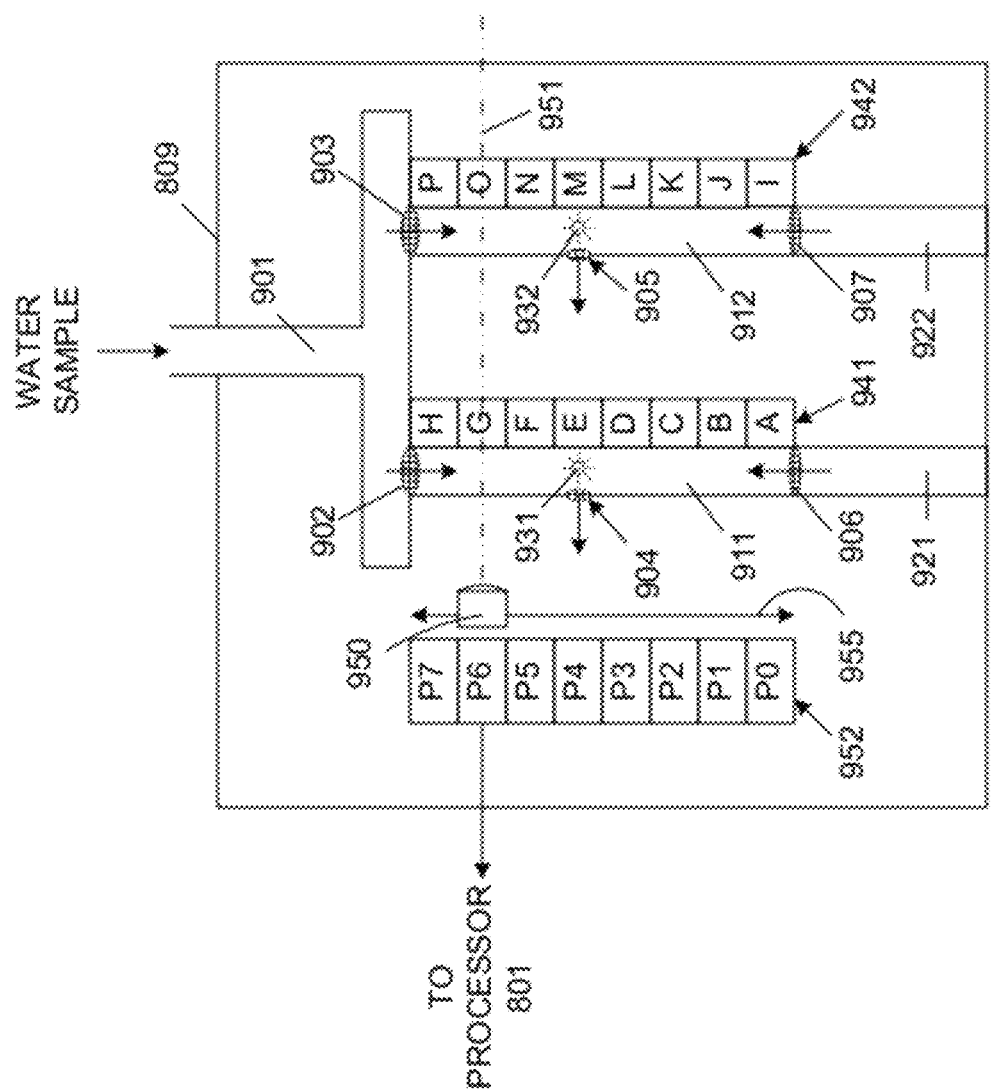
FIG. 9 is a schematic diagram of a water field testing device in accordance with one embodiment of the present invention.

FIG. 9 is a schematic diagram of water field testing device 809 in accordance with one embodiment of the present invention. Water field testing device 809 includes water reservoir 901, valves 902-907, mixing vials 911-912, chemical vials 921-922, backlights 931-932, color charts 941-942, laser 950 and laser positioning device 952.

Water field testing device 809 operates as follows in accordance with one embodiment of the present invention. The fisherman initially transfers the water sample from lure 201 into water reservoir 901, such that the water sample is placed into contact with valves 902 and 903. Chemical vials 921 and 922 are replaceable elements, which are inserted into water field testing device 809 as illustrated. Chemical vials 921 and 922 contain different chemicals for identifying the presence of impurities and trace elements in the water sample. Chemical vials 921-922 can be joined together to form a single cartridge, which is easily inserted or removed from water field testing device 809. Valves 906 and 907 separate the chemicals in vials 921 and 922 from mixing vials 911 and 912, respectively. Valves 904 and 905 are connected to a common plunger (not shown). When this plunger is pulled, the resulting pressure opens valves 902-907. As a result, the water sample is drawn into mixing vials 911-912 through valves 902-903, respectively, and the test chemicals are drawn into mixing vials 911-912 through valves 906-907, respectively. The fisherman may then gently shake water field testing device 809 to mix the water sample with the test chemicals.

The test chemicals are selected to turn certain colors in the presence or absence of selected impurities or trace elements. For example, the test chemical introduced by chemical vial 921 may turn various shades of a known color (e.g., blue) in the presence of various concentrations of mercury. The associated color chart 941 shows these various shades of the known color, which are labeled A to H. After the contents of mixing vial 911 have had a chance to combine and turn to the resulting color, backlight 931 is turned on. The fisherman compares the actual color of the contents of mixing vial 911 with the color chart 941 to determine the shade on the color chart 941 which most closely matches the color of the contents of mixing vial 911.

In one embodiment, the fisherman can use laser positioning system 952 to move laser 950 along axis 955, until the laser beam 951 intersects the region of the color chart 941 which most closely matches the color of the contents of mixing vial 911. The movement of laser 950 may be implemented, for example, by a jog wheel controller. When laser 950 has been properly positioned, the fisherman actuates an 'enter' switch (e.g., presses the jog wheel controller inward), thereby sending a signal to processor 801 which identifies the position of laser 950 (e.g., P0-P7). Processor 801 stores this signal, which represents the result of the first water test, in memory 807. In an alternate embodiment, color chart 941 can be labeled with numbers identifying the different color hues, and the fisherman can simply enter the number of the color chart 941 that corresponds with the color of the contents of mixing vial 911.

When the fisherman has entered the result associated with mixing vial 911, backlight 931 is turned off, and backlight 932 is turned on. The process is then repeated for mixing vial 912 and color chart 942.

Although water field testing device 809 has been described in connection with a pair of water tests, it is understood that other numbers of water tests can be performed in other embodiments. In one embodiment, there are 35 different chemical vials provided to test for 35 corresponding water impurities and trace elements.

The fisherman can also weight the fish that was caught by attaching the fish to scale 810 (e.g., via an external connector on control unit 203). Processor 801 receives the results of the weighing, and stores the measured weight of the fish in memory 807. In one embodiment, scale 810 is implemented by a tension load cell available from Measurement Specialties (www.meas-spec.com) as part number FT24.

Figure 10:
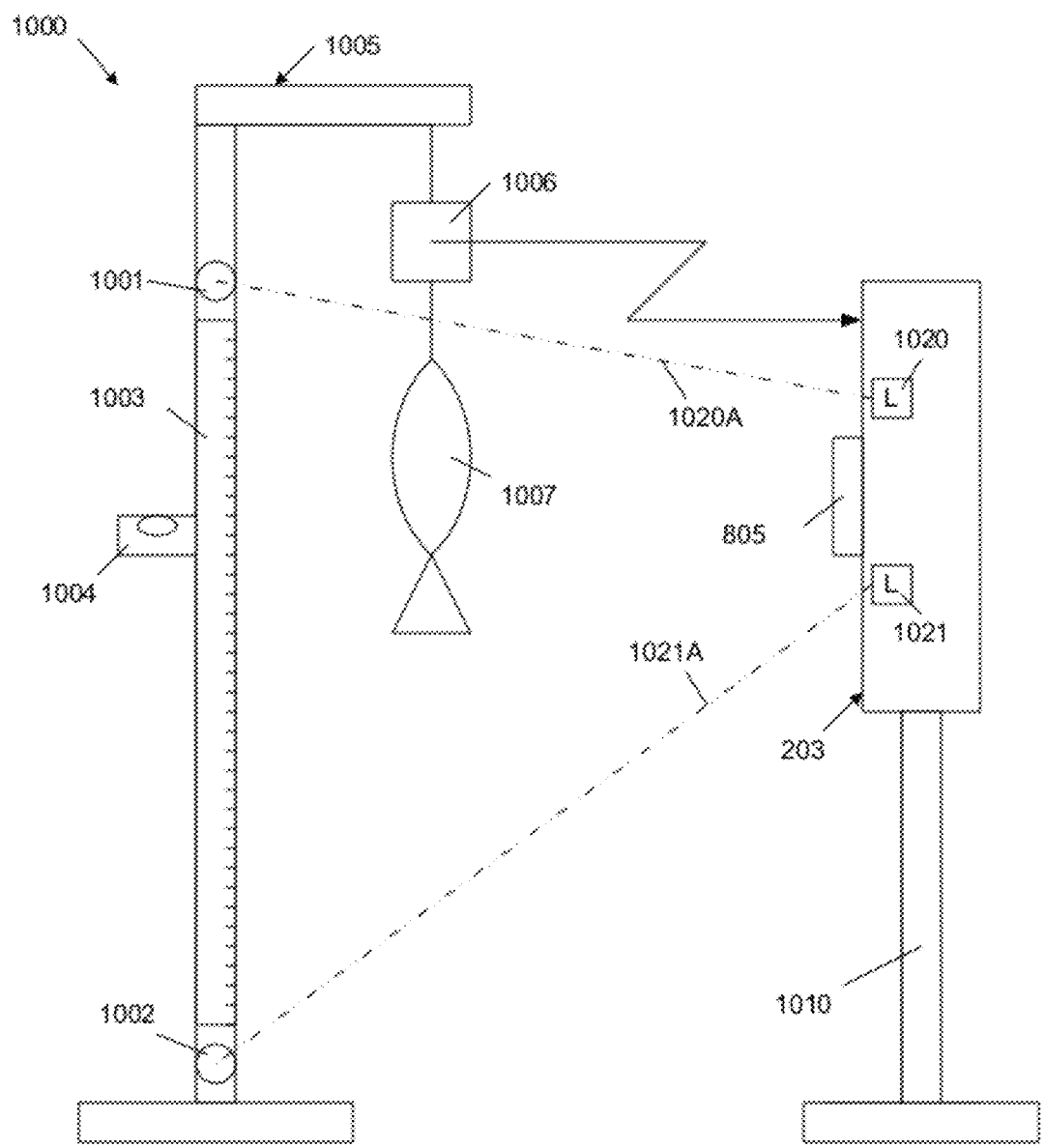
FIG. 10 is a schematic diagram of a T-square device used to measure the length and weight of a fish in accordance with another embodiment of the present invention.

FIG. 10 is a schematic diagram of a T-square device 1000 in accordance with another embodiment of the present invention. As described in more detail below, T-square device 1000 can be used to measure the weight of the fish and take a calibrated picture of the fish, such that the length of the fish can be determined. T-square device 1000 includes frame 1005 and optional scale 1006. Frame 1005 includes targets 1001-1002, measuring stick 1003 and level 1004. Frame 1005 is fixed in the position shown, such that level 1004 indicates that the T-square device 1000 has a predetermined alignment (e.g., level). Fish 1007 is hung from scale 1006. In one embodiment, scale 1006 transmits the weight of fish 1007 to handheld device 203. In another embodiment, scale 1006 displays the weight of fish 1007, and the camera 805 on handheld device 203 takes a picture of this displayed weight. In yet another embodiment, scale 1006 is replaced with a simple hanger for suspending fish 1007.

After fish 1007 has been suspended from frame 1005, the fisherman positions the handheld device 203, such that fixed lasers 1020 and 1021 on handheld device 203 transmit beams 1020A-1021A onto targets 1001-1002 on frame 1005. A supporting structure 1010, such as a monopod or tripod, can be used to stabilize handheld unit 203. When the beams 1020A-1021A illuminate the corresponding targets 1001-1002, the fisherman takes a picture with camera 805. The picture will show fish 1007, illuminated targets 1001-1002, level 1004, measuring stick 1003 and scale 1006. Note that lasers 1020-1021, targets 1001-1002 and level 1004 result in a calibrated picture of fish 1007. Thus, the picture can be used to accurately determine the length of fish 1007. Because all handheld units and t-squares are identical, the calibrated pictures taken by different fisherman can be compared in a meaningful way. The picture taken by camera 805 is stored in memory 807.

In an alternate embodiment, targets 1001-1002 and lasers 1020-1021 are replaced with an acoustic rangefinder on handheld device 203. This acoustic rangefinder can be, for example, the same device used to implement depth sounder 307 on lure 201. Before taking a picture, the fisherman must enable the rangefinder. The rangefinder identifies the distance between the handheld device 203, and transmits the result to processor 801. In response, processor 801 actuates a speaker, which emits a series of audible beeps. The time between beeps is directly related to the distance between the handheld device 203 and the T-square device 1000. The fisherman moves the handheld device 203 to a desired, predetermined distance from the T-square device 1000, using the beeps as a guide. When the beeps are controlled to have a predetermined state (e.g., silent or constant), the handheld device 203 allows the fisherman to take a picture of the fish. Alternately, the picture may be taken automatically when the beeps are controlled to have the predetermined state. This method also provides calibration to the resulting picture.

When all of the desired information has been stored in memory 807, this information is downloaded to a dedicated server on the Internet. The fisherman may start this download via the user interface 808. In response, processor 801 establishes a wireless network (e.g., WiFi) connection via wireless network port 802. Once the wireless network connection is established, processor 801 transmits the data stored in memory 807 on the wireless network. The dedicated server coupled to the wireless network stores the data retrieved from memory 807 in a large database.

In an alternate embodiment, processor 801 may transmit the stored data on a wired network using wired network port 804. Wired network port 804 can be, for example, a USB port or a firewire port.

Processor 801 can also transmit other instructions and information to lure via wireless communication ports 803 and 310. For example, processor 801 may transmit instructions that cause processor 301 to test the various elements of E/M control circuit. Processor 301 then returns the results of the test to processor 801 to indicate whether the various elements of E/M control circuit 300 are operating properly. After retrieving data from lure 201, processor 801 may transmit a reset signal, which causes processor 301 to erase memory 320 and/or recalibrate the various sensors in E/M control circuit 300. Processor 801 may also transmit instructions to processor 301 that define the desired path of lure 201 in the water. That is, processor 801 may transmit instructions that identify the manner in which actuators 305 control the rudders 230. The fisherman may enter information identifying the desired path of lure 201 via user interface 808.

The information stored in the dedicated server can be used for a variety of applications that enhance the fishing experience. For example, the server may function as a central clearinghouse for region or national fishing contests. These fishing contests may be held for fun or money. For example, each fisherman may pay a nominal fee (e.g., $1) to enter a fishing contest to be held during a certain time and/or in a certain location or locations. Pre-payment of the entry fee would typically be made by credit card over the Internet. Upon receiving payment, the serial number of the entrant's lure would be validated for the contest. Each fisherman may decide to enter multiple lures in a contest, with an entry fee being paid for each lure. The fisherman would then go fishing at the designated time and/or location. The fisherman would then transmit data associated with any caught fish to the server in the manner described above. At the end of the contest, one or more contest winners could be verified using the information stored in the server, and the results could be displayed on an associated website. Each winner may receive a prize, typically in the form of a credit to their credit card account, free entry to future contests, and/or certificates for a free lure. Portions of the collected entry fees could be used, for example, (1) as prize money for the contest winners (2) to pay for the upkeep of the server/database, (3) to support various environmental causes/charities (4) to establish a mentor program, wherein experienced fishermen are connected with others who are interested in learning about fishing.

In accordance with another embodiment, the database maintained by the server may be used for environmental research. With enough fishermen adopting the fishing system, large amounts of data would be compiled, including: location, time, date, water quality, water depth, water temperature, water clarity, fish size, and fish appearance. Such a database could be invaluable to environmental researchers. Access to the database could be free or there could be a fee to access the database.

Figure 11:
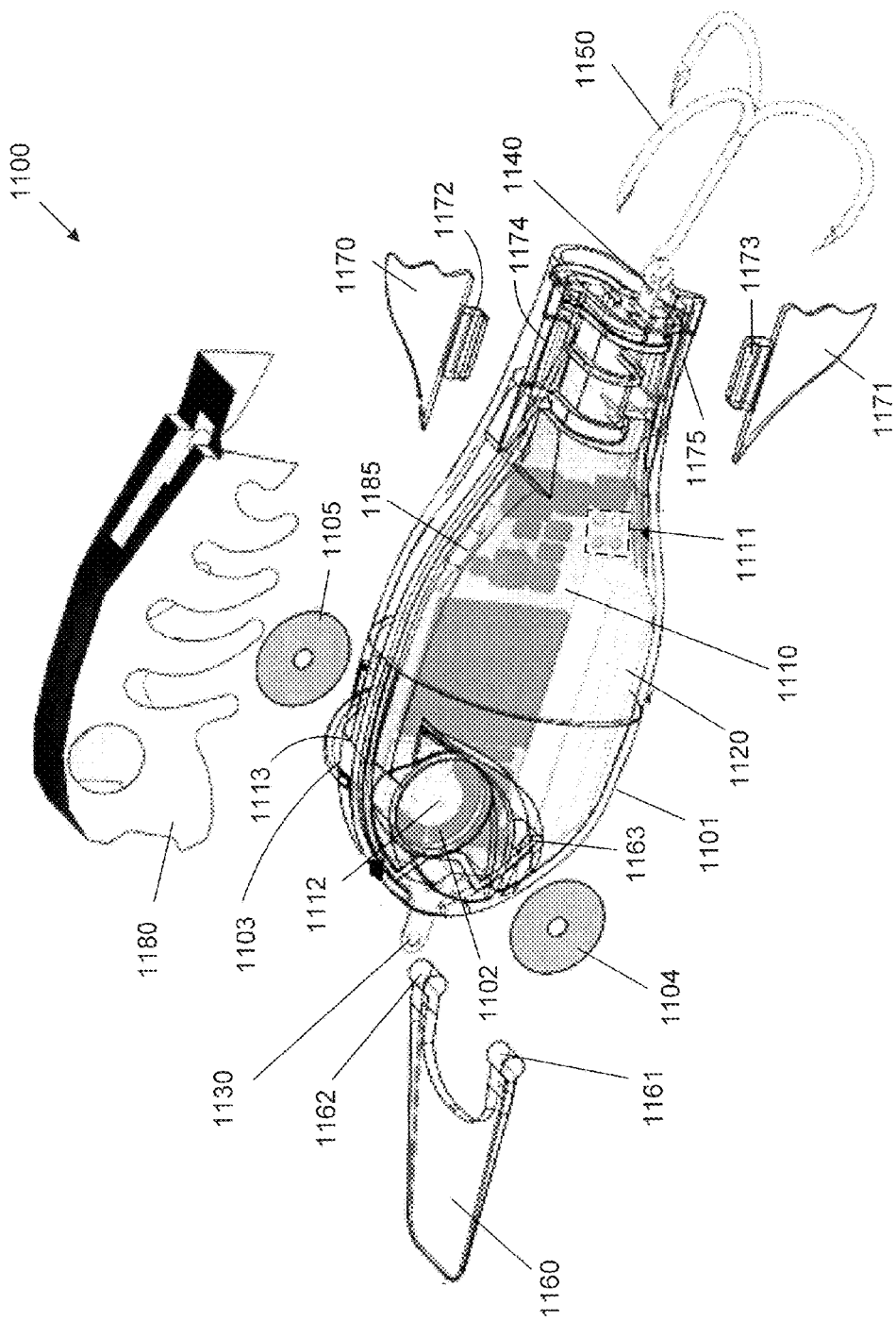
FIG. 11 is an exploded view of a fishing lure in accordance with an alternate embodiment of the present invention.
Figure 12:
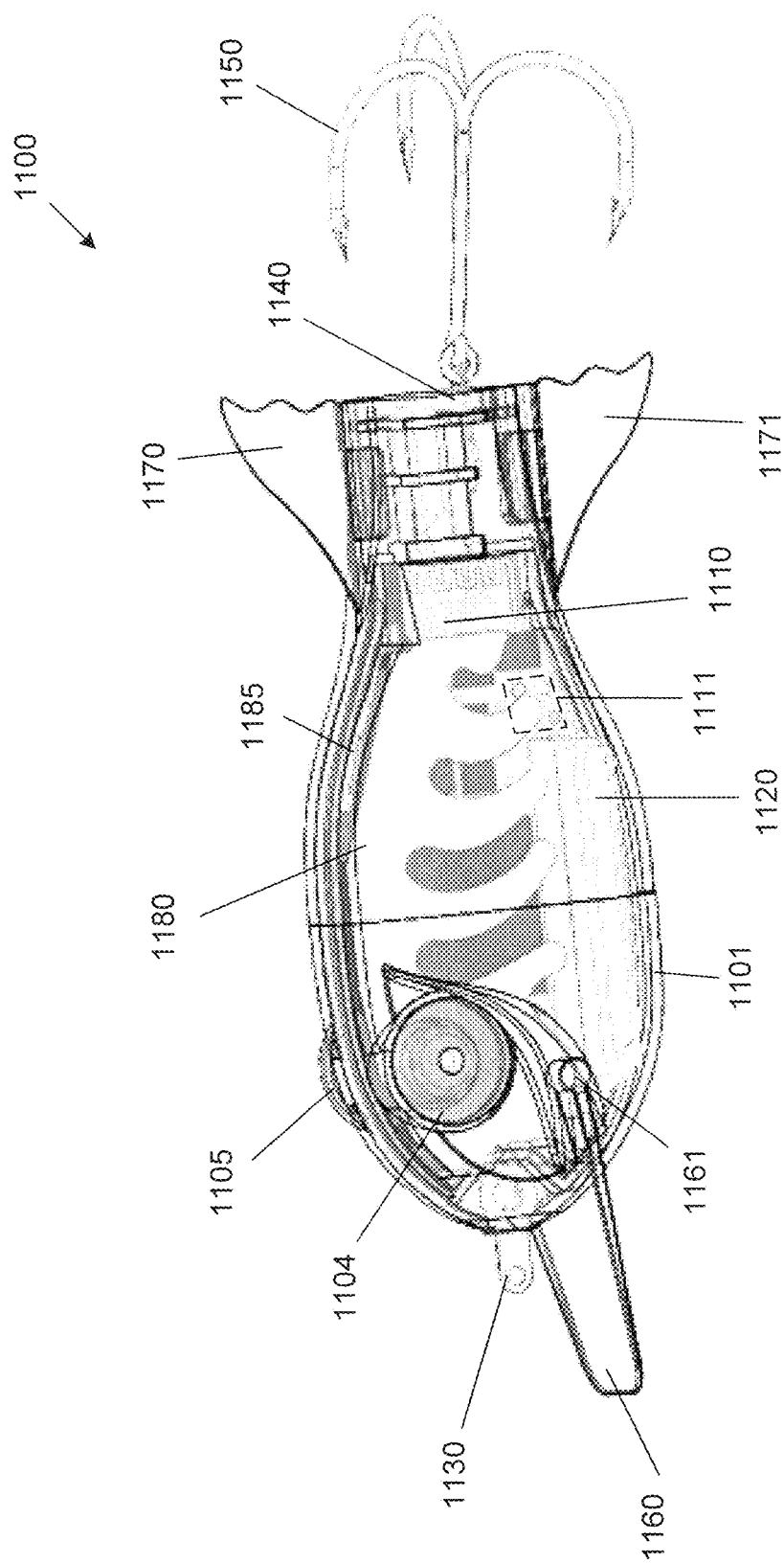
FIG. 12 is an assembled view of the fishing lure of FIG. 11 in accordance with one embodiment of the present invention.

FIG. 11 is an exploded view of a lure 1100 in accordance with an alternate embodiment of the present invention. FIG. 12 is an assembled view of lure 1100. Lure 1100 includes many of the features/elements described above in connection with lure 201. For example, lure 1100 includes a lure body 1101, a printed circuit board (PCB) 1110, battery 1120, line attachment structure 1130, rear strain gauge 1140 and hook 1150. Printed circuit board 1110 includes electronic devices necessary to perform the various sensing functions described above (e.g., temperature sensor, depth sensor, light sensor, strain gauge, digital camera.) Printed circuit board 1110 also includes electronic circuitry used to uniquely identify lure 1100, capture the various sensed information, and wirelessly communicate with an external device, in the manner described above in connection with lure 201. Differences between lure 1100 and lure 201 are described below.

Bill 1160 attaches to the front of the lure body 1101. Bill 1160 can include tabs 1161-1162 that are engaged with corresponding grooves in the lure body 1100 (i.e., a snap fit). For example, tab 1161 engages with groove 1163 in lure body 1100, and tab 1162 engages with another groove (not shown) on the opposing side of lure body 1100. Different bill shapes can be used to cause the lure to move differently in the water. For example, different bills can be used to cause the lure to move at different depths in the water. In accordance with one embodiment, different bills can have different sizes or shapes, or attach to the lure body 1101 at different angles to provide different movements in the water. In general, bill 1160 is located below the line attachment structure 1130, and is angled slightly downward, thereby tending to pull the lure 1101 downward as the lure moves through the water.

Tail fins 1170 and 1171 are attached to the rear of the lure body 1101 as illustrated. Tail fins 1170 and 1171 also effect the manner in which the lure 1100 moves through the water. In general, tail fins 1170-1171 provide vertical stabilization for the lure 1100. In one embodiment, tail fins 1170-1171 include tabs 1172-1173 that are engaged in corresponding slots 1174-1175 in the lure body 1101. Tail fins 1170-1171 are therefore easily replaced.

In one embodiment, the bill 1160 and tail fins 1170-1171 can be replaced with a bill and tail fins having different colors. For example, the bill 1160 and tail fins 1170-1171 may be yellow, green, orange etc., thereby allowing the fisherman to easily change the visual appearance of the lure.

In the illustrated embodiment, the lure body 1101 is made of a transparent material (e.g., plastic). In order to make the lure appear more like a fish, an optically reflective shroud 1180 is included within the lure body 1101. The reflective shroud 1180 is patterned to present an appearance of stripes/gills of a fish body.

A magnetic switch 1185 is mounted on the printed circuit board 1110, wherein the electronics on the printed circuit board 1110 are turned on/off by placing the magnetic switch 1185 in close proximity with a magnetic trigger (not shown).

LED lights 1111 are located on one or more surfaces of printed circuit board 1110. Because the PCB 1110 is mounted vertically within lure body 1101, the LED lights 1111 face the sides of the lure 1100. The control processor on PCB 1110 controls LED lights 1111 (under the direction of the user), such that these lights are turned off or on. The control processor on PCB 1110 also controls the color of light emitted from LED lights 1111 (e.g., red, orange, yellow, green, blue, violet, etc.). Changing the color of light emitted from LED lights 1111 advantageously allows the fisherman to control the appearance of the lure 1100 in the water. In one embodiment, the color emitted by the LED lights 1111 is recorded when a fish strikes the lure 1100, thereby allowing the fisherman to identify colors that may attract various fish.

In the embodiment illustrated, digital cameras 1112-1113 are located on opposite sides of PCB 1110, such that these digital cameras provide lateral views through optical windows 1102-1103 formed from the transparent lure body 1101. Note that the optical windows 1102-1103 may be shaped to function as lenses for digital cameras 1112-1113. Digital cameras 1112-1113 take pictures/video in a manner known to those of ordinary skill in the art. Eye pieces 1104 and 1105 are attached to the optical windows 1102-1103 of the lure body 1101 as illustrated. The eye pieces 1104-1105 include openings that expose the lenses of the digital cameras 1112-1113. The eye pieces 1104-1105 look like the eyes of a fish, thereby giving the lure a more realistic fish-like appearance. Eye pieces 1104-1105 can be replaced with other eye pieces having different colors, thereby further changing the appearance of the lure 1100.

Figure 13:
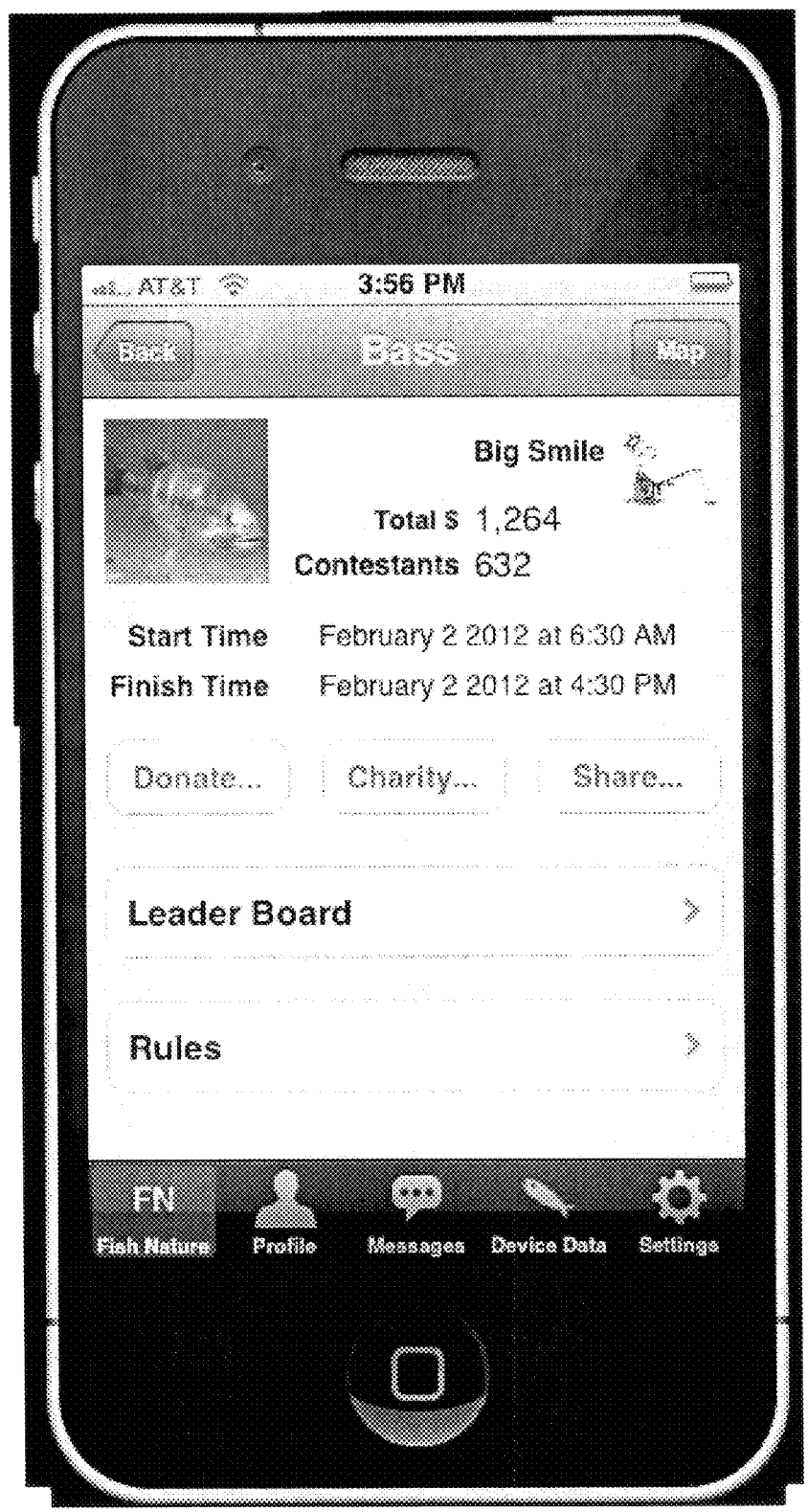
FIGS. 13, 14, 15, 16, 17, 18, 19 and 20 are screenshots of an application that implements a fishing contest in accordance with one embodiment of the present invention.
Figure 14:
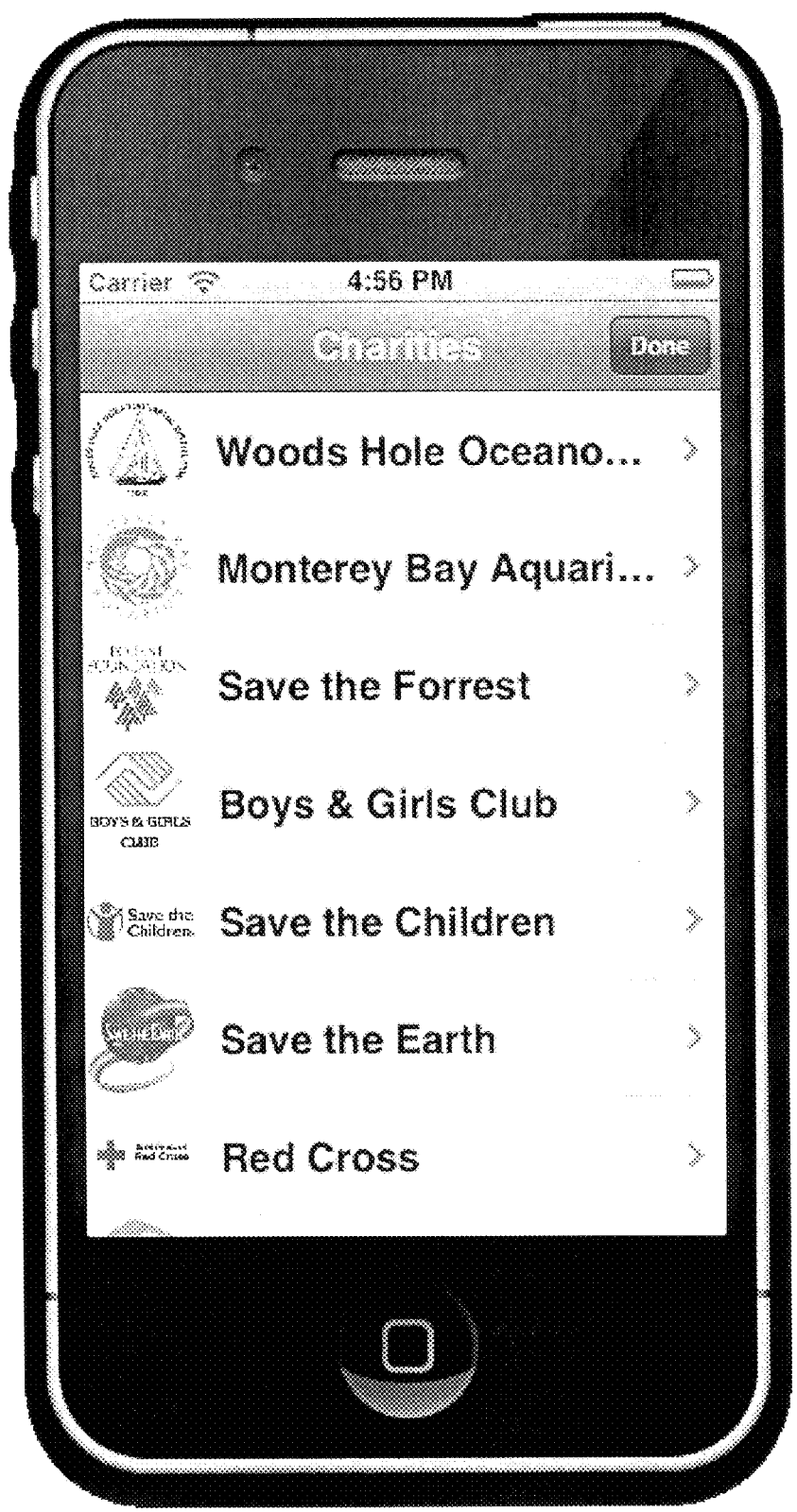

In accordance with another embodiment, a fishing contest using lure 1100 can be implemented using an application running on a wireless device (e.g., an iPhone®). FIGS. 13-20 illustrate screenshots of an application in accordance with one embodiment of the present invention. As illustrated by FIG. 13, a first page of the application may illustrate a particular contest (e.g., "Bass"), the number of participants signed up for the contest (e.g., "Donors 632"), the total fees collected from the participants (e.g., "Total $1,264"), and the start and finish times of the contest. User selectable buttons are provided to enable a fisherman to make a donation (e.g., "Donate . . . ") to enter the contest, select a charity to receive the donation (e.g., "Charity . . . "), and share the fact that the fisherman has entered the contest with friends (e.g., "Share . . . "). FIG. 14 illustrates an exemplary screen that may appear after pressing the "Charity . . . " button, which presents a list of charities that can be selected. Note that a portion of the donations can be provided to the charities and a portion of the donations can be provided to the winner(s) of the fishing contest.

Figure 15:

Returning to FIG. 13, the application also provides a selectable button that displays the contest rules (e.g., "Rules"). The application also provides a selectable button that displays a leader board (e.g., "Leader Board") that allows the fisherman to monitor the progress of the fishing contest. FIG. 15 illustrates an exemplary Leader Board screen, which is generated in response to fish caught by the participants of the fishing contest (e.g., Martin is currently in first place, with a fish weighing 15.1 pounds). The Leader Board keeps track of all events and game mechanic points in a manner described below.

Figure 16:
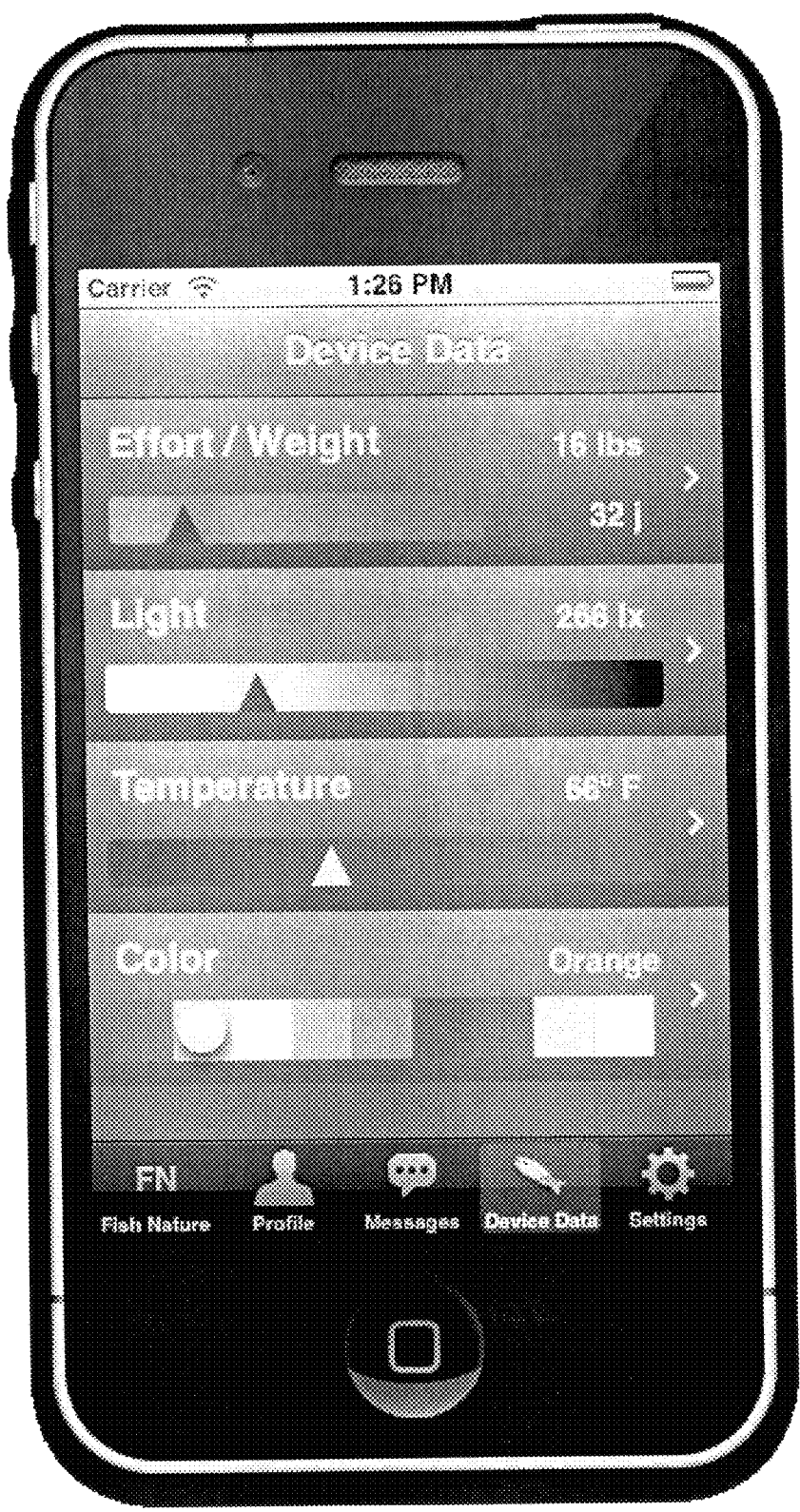

The user can "click" the various entries of the Leader Board to see more details associated with the caught fish. For example, "clicking" on the first place entry of the Leader Board would bring up the screen of FIG. 16, which illustrates details regarding the 15.1 pound fish caught by Martin. As illustrated by FIG. 16, the fish caught by Martin weighs 15.1 pounds and required 32 Joules of effort to land. This information is derived from the strain gauge 1140 on the lure 1100. As also illustrated by FIG. 16, the lure 1100 recorded an ambient light of 266 lux, temperature of 66° F., and a lure color of "orange" at the time that the fish struck the lure. Note that the above described information is stored by the lure 1100, and is transmitted wirelessly (e.g., via Bluetooth connection) to the wireless device (e.g., iPhone®). The application in the wireless device uploads this information to a server via the wireless network (e.g., AT&T, Verizon). This information is made available to the wireless devices of the fishing contest participants (via the wireless network).

Other information that can be recorded includes, the identity of the type of bill 1160 used (to determine the dive depth), barometric pressure (as measured by the depth gage) and GPS location, as determined by a GPS locator in the wireless device when the information is uploaded from the lure 1100 to the wireless device.

The above-described recorded data can be used to help the fisherman predict the most effective lure color and/or bill type for various conditions.

Figure 17:
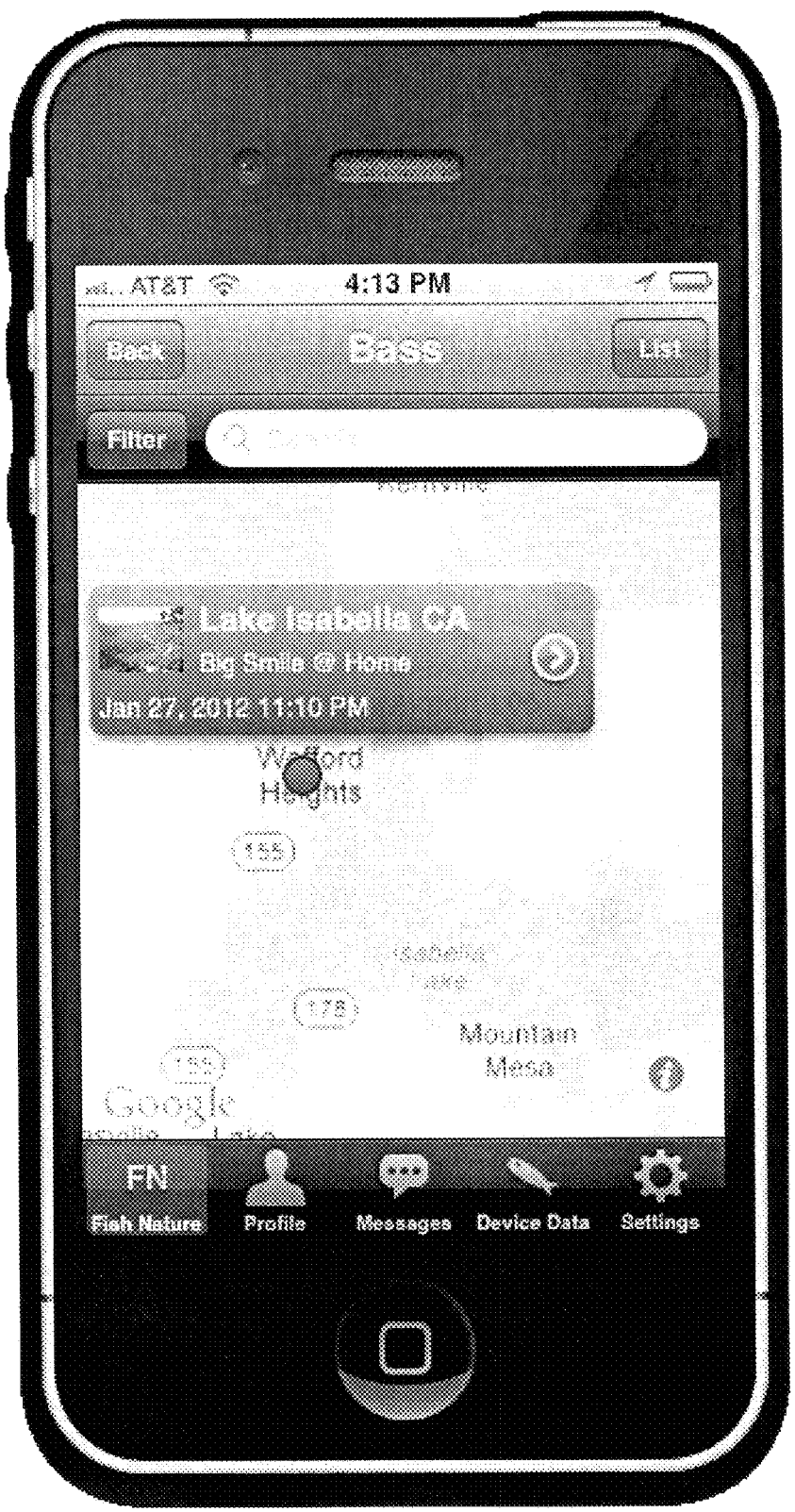
Figure 18:

FIG. 17 illustrates another screen that can be displayed by the wireless application. In accordance with one embodiment, the general location of the fishing contest (e.g., Isabella Lake) can be illustrated on a map, along with green dots that display the locations of the various fishing contest participants during the contest hours. Again, these locations may be provided using the GPS functionality of the wireless devices carried by the fishermen. In another embodiment, the favorite fishing spot of the fisherman can be displayed as a red dot outside of the contest hours. As illustrated by FIG. 18, the application also provides messaging that enables users of the application (e.g., participants in the fishing contest) to communicate with one another.

Figure 19:

As illustrated by FIG. 19, the application also includes a profile page that includes a "Logbook" that records and secures all data downloaded from the uniquely identified lure 1100. The profile page also includes user details, including, for example, name and picture, and user account details.

Figure 20:
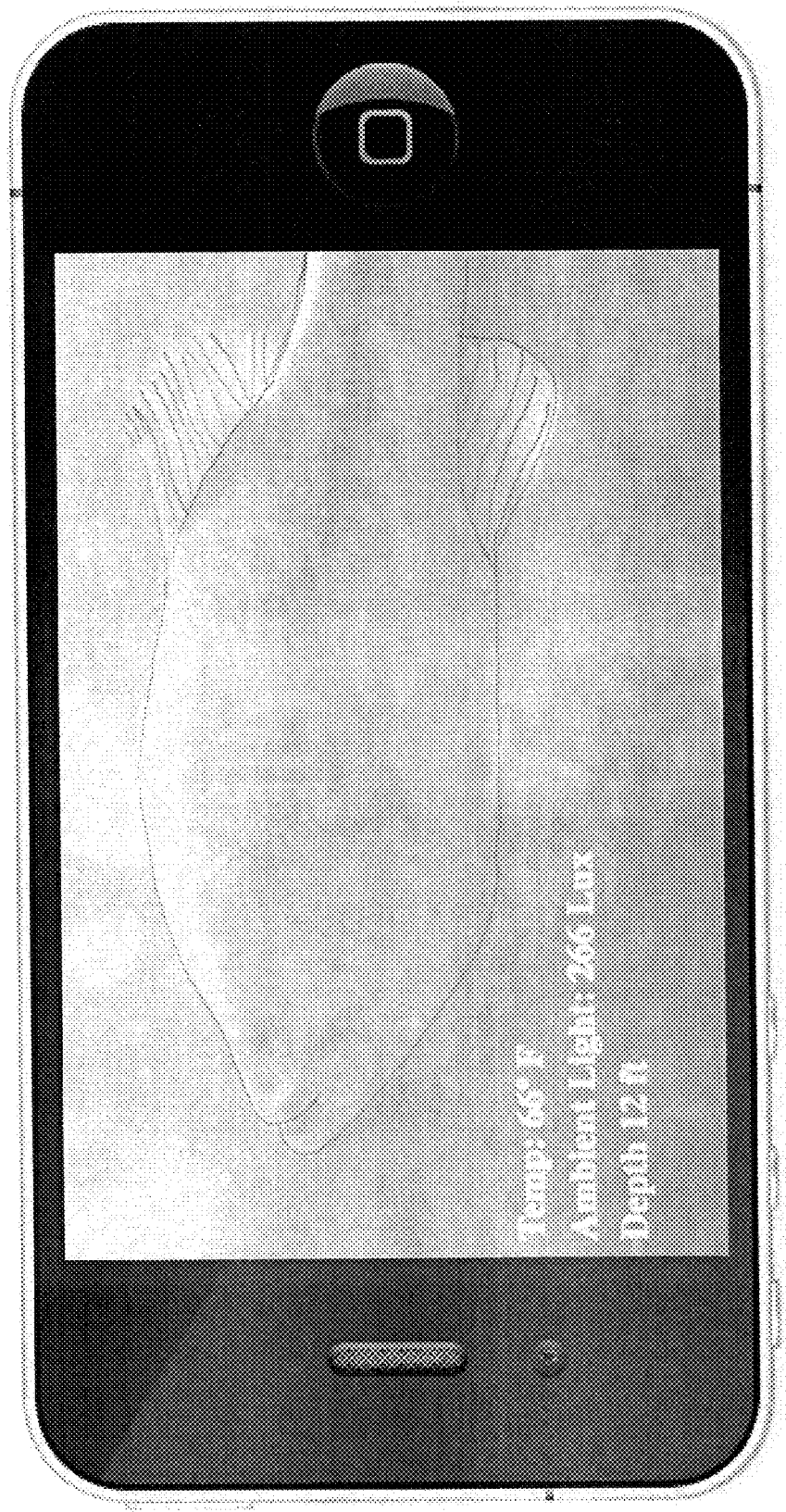

As illustrated by FIG. 20, the application also stores videos/pictures recorded by the digital cameras on the lure 1100, which can be shared with others via social networks. In one embodiment, video from the digital cameras 1112-1113 is buffered in a memory on printed circuit board 1110. In response to a detecting a fish strike, the video data is stored from a predetermined time before the detected fish strike (e.g., 10 seconds prior to the detected fish strike) to a predetermined time after the detected fish strike (e.g., 10 seconds after the detected fish strike), thereby providing a video record of the catch.

Although the present invention has been described in connection with several embodiments, it is understood that this invention is not limited to the embodiments disclosed, but is capable of various modifications which would be apparent to one of ordinary skill in the art. For example, in different embodiments, E/M control system 300 and control unit 203 may include various subsets of the elements illustrated in FIGS. 3 and 8, thereby providing lures with different functionalities. In addition, although the movement of lure has been described using an aileron and rudder system, it is understood that the movement of the lure may be defined by one or more controllable ballast devices may be located within the lure. Moreover, lure 201 can additionally include other features of conventional lures, including for example, a scent chamber for storing a bait ball. Thus, the invention is limited only by the following claims.

I claim:

1. A fishing lure comprising: a transparent lure body including a first transparent optical window; and a first digital camera mounted within the transparent lure body adjacent to the first transparent optical window, wherein the first transparent optical window operates as a lens of the first digital camera; a line attachment element located at a front end of the transparent lure body; and a detachable bill coupled to a front end of the lure body, wherein the detachable bill controls a depth of the fishing lure in the water.

2. The fishing lure of claim 1, wherein the transparent lure body further includes a second transparent optical window, the fishing lure further comprising a second digital camera mounted within the transparent lure body adjacent to the second transparent optical window, wherein the second transparent optical window operates as a lens of the second digital camera.

3. The fishing lure of claim 2, wherein the first and second transparent optical windows are located on opposing sides of the transparent lure body.

4. The fishing lure of claim 2, wherein the transparent lure body is shaped like a fish body, and wherein the first and second transparent optical windows are located at positions that correspond with eye locations on the fish body.

5. The fishing lure of claim 2, further comprising annular eye pieces coupled to the transparent lure body, wherein the annular eye pieces include openings through which the first and second transparent optical windows are exposed.

6. The fishing lure of claim 1, further comprising a printed circuit board mounted in the transparent lure body, wherein the first digital camera is coupled to the printed circuit board.

7. The fishing lure of claim 1, further comprising an optically reflective shroud mounted within the transparent lure body.

8. The fishing lure of claim 7, wherein the optically reflective shroud is patterned to resemble a surface of a fish.

9. The fishing lure of claim 1, further comprising one or more light emitting devices located within the transparent lure body, wherein the one or more light emitting devices emit different colored lights through the transparent lure body.

10. The fishing lure of claim 9, further comprising means for selecting a light color emitted by the one or more light emitting devices.

11. The fishing lure of claim 1, further comprising:
a first fin detachably coupled to a top surface of the lure body; and
a second fin detachably coupled to a bottom surface of the lure body.

12. The fishing lure of claim 11, wherein the first and second fins are aligned along a vertical axis of the transparent lure body.

* * * * *